United States Patent
Jeong et al.

(10) Patent No.: US 11,627,370 B1
(45) Date of Patent: Apr. 11, 2023

(54) CONVERTING VIDEO ACCORDING TO STATUS OF USER DEVICE

(71) Applicant: KT CORPORATION, Gyeonggi-do (KR)

(72) Inventors: Yeong-Hwan Jeong, Gyeonggi-do (KR); Jin-Hyoun Youn, Seoul (KR); Kang-Tae Lee, Gyeonggi-do (KR); Jae-Won Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/563,581

(22) Filed: Dec. 28, 2021

(51) Int. Cl.
| | |
|---|---|
| *H04N 21/44* | (2011.01) |
| *H04N 21/47* | (2011.01) |
| *G06V 10/46* | (2022.01) |
| *G06V 10/98* | (2022.01) |
| *H04N 21/4402* | (2011.01) |
| *H04N 21/472* | (2011.01) |
| *G06V 40/16* | (2022.01) |
| *G06V 20/40* | (2022.01) |

(52) U.S. Cl.
CPC ......... *H04N 21/4402* (2013.01); *G06V 10/46* (2022.01); *G06V 10/98* (2022.01); *G06V 20/46* (2022.01); *G06V 40/161* (2022.01); *H04N 21/47202* (2013.01); *H04N 21/47205* (2013.01)

(58) Field of Classification Search
CPC ......... H04N 21/4402; H04N 21/47202; H04N 21/47205; G06V 10/46; G06V 10/98; G06V 20/46; G06V 40/161
See application file for complete search history.

(56) References Cited

U.S. PATENT DOCUMENTS

| | | | |
|---|---|---|---|
| 9,323,989 B2 * | 4/2016 | Ohishi | G06V 40/19 |
| 10,303,928 B2 | 5/2019 | Taine et al. | |
| 10,929,979 B1 * | 2/2021 | Dimson | G06V 40/103 |
| 2016/0182600 A1 * | 6/2016 | Swaminathan | H04N 21/2393 709/217 |
| 2017/0125064 A1 * | 5/2017 | Aggarwal | G06V 20/46 |
| 2018/0063482 A1 | 3/2018 | Goesnar | |
| 2020/0020071 A1 * | 1/2020 | Frey | G06T 11/20 |

FOREIGN PATENT DOCUMENTS

| | | |
|---|---|---|
| KR | 10-0963103 B1 | 6/2010 |
| KR | 10-2011-0007397 A | 1/2011 |

\* cited by examiner

*Primary Examiner* — Alazar Tilahun
(74) *Attorney, Agent, or Firm* — IP Legal Services, LLC

(57) ABSTRACT

Provided is dynamically converting a video being displayed on a user device according to changes in a holding direction and a display direction of the user device. The user device may include a processor: generate a request message for requesting a predetermined video to a contents server and transmit the request message to the contents server through the communication circuit, receive the requested video from the contents server in response to the request message through the communication circuit, detect a target object from each image frame of the received video and define a region of interest based on the detected target object; determine whether error occurs in detecting the target object at each image frame and correct the region of interest when error occurs; defining a crop region based on the corrected region of interest; and converting the received video to a second video based on the crop region.

17 Claims, 17 Drawing Sheets

```
[pseudo code]

if (firstFrameLatency >34){  ~840
    switch (resolution){
        case "FHD" :
            resolution -> HD;     } 841
            return;
        case "HD" :
            resolution -> SD;     } 842
            return;
        case "SD" :
            frameRate = adjustFrameRate;  }
            if (frameRate < 10)             } 843
                return false;
    }
}else if (firstFrameLatency < 34){         } 844
    Thread.sleep(34 - firstFrameLatency)
}
```

CONVERTING VIDEO ACCORDING TO STATUS OF USER DEVICE

BACKGROUND

The present disclosure relates to dynamically converting video according to status of a user device. In particular, the present disclosure relates to dynamically converting video being displayed on a user device according to changes in one of a holding direction and a display direction of the user device.

Lately, it is common and popular to use a mobile device to watch multimedia contents through various types of streaming services. It is because the most of mobile devices has fast communication capability to receive a large amount of data at high speed and superior processing power to reproduce (e.g., render) and display high-quality video and audio data in real time. Accordingly, such capabilities of a mobile device allow users to watch multimedia contents anytime and anywhere. That is, the mobile device free the users from many restrictions and limitations. However, users still have difficulties to obtain an optimal viewing experience of video, and such difficulties make the user discomfort.

For example, video contents are typically produced to be displayed with a default display setting, such as a display aspect ratio of 16:9, a display resolution of 2560×1086, and a landscape display direction. To watch such video contents with an optimal viewing experience, it is necessary to render and display the video contents at the mobile device with conditions (e.g., display setting of the mobile device) proper to the default display setting of the video contents.

When viewers watch video contents with mobile devices, such as smart phones and tablets, it is better for users to turn and hold the mobile device sideway (e.g., horizontal) for ensuring the optimal viewing experience because the video contents are originally produced to be displayed in the display aspect ratio of 16:9 and a landscape display direction. When viewers turn and hold their mobile devices vertically, the video contents are displayed in a portion of a screen to maintain the default display setting of the video contents. That is, the actual display size of video contents is shrunken. Such a way of displaying the video contents may degrade viewer's viewing experiences.

FIG. 1A shows a typical way of watching video contents using a mobile device. As described, video contents are generally produced to be displayed at a display aspect ratio of 16:9. That is, video contents have a display setting, such as a display aspect ratio, a resolution, and a frame per second ratio (FPS), to be proper to display the video contents at a display aspect ratio of 16:9 in a landscape display direction. Accordingly, a user usually playback and watch video contents by holding mobile device 10 horizontally (e.g., horizontal holding direction) to have optimal viewing experience of the video contents. In this way, a user is able to display the video contents 11 in full screen of mobile device 10. In order to hold user device 10 sideway, the user uses two hands, as shown in FIG. 1A. The user might use one hand to hold mobile device 10 horizontally, but it might be unnatural and make the user very discomfortable.

However, the user may not want to hold mobile device 10 in sideway for such a long time or may want to hold mobile device 10 vertically. Further, the user may want to lay mobile device 10 vertically against a wall. For example, FIG. 1B shows another typical way of watching video contents using mobile device 10. As shown in FIG. 1B, the user may hold mobile device 10 vertically (e.g., vertical holding direction) using one hand. In this case, mobile device 10 displays the video contents using a part of screen 11 because it needs to maintain the aspect ratio as 16:9. That is, the user must watch the video contents in the shrunken size 11. Accordingly, it is difficult for the user to have the optimal viewing experience.

SUMMARY

In accordance with an aspect of the present embodiment, a video displayed on a user device may be dynamically converted according to changes in one of a holding direction and a display direction of the user device.

In accordance with another aspect of the present embodiment, a region of interest in a first video displayed on a user device may be identified and cropped as a crop region, and only the crop region may be displayed as a second video on the user device according to changes in status of the user device.

In accordance with one embodiment, a user device may be provided for dynamically converting a video according to status changes. The user device may include an input/output circuit configured to receive user inputs and output results of performing operations in response to the received user inputs, a communication circuit configured to receive data from and transmit data to other entities connected through a communication network, a display configured to output information and data produced as a result of performing operations, a memory configured to store information and data, received from other entities through the communication circuit or generated as a result of performing operations, a sensor configured to sense a holding direction of the user device, and a processor configured to control constituent elements of the user device for performing operations for dynamically converting a video according to status changes. The processor is configured to generate a request message for requesting a predetermined video to a contents server and transmit the request message to the contents server through the communication circuit, receive the requested video from the contents server in response to the request message through the communication circuit, detect a target object from each image frame of the received video and define a region of interest based on the detected target object; determine whether error occurs in detecting the target object at each image frame and correct the region of interest when error occurs; define a crop region based on the corrected region of interest; convert the received video to a second video based on the crop region.

The processor is configured to trace the target object along consecutive image frames of the received video; and extract information on a coordinate of the traced target object from each image frame.

The processor is configured to trace a face as the target object along consecutive image frames of the received video; and extract information on a center coordinate of the face from each image frame.

The processor is configured to: determine whether a scene is changed between adjacent image frames where the face is detected; and when the scene is not changed, calculate a difference between the coordinate of the face in a previous image frame and the same in a current image frame, determine whether the difference is greater than a predetermined threshold value, and determine that error occurs in detecting the face in the current image frame when the difference is greater than the predetermined threshold value.

The processor is configured to correct the coordinate of the face in the current image frame when error occurs in detecting the face in the current image frame.

The processor is configured to detect a body closely related to the face from each image frame; and extract a coordinate of the detected body from each image frame.

The processor is configured to calculate a difference between the coordinate of the body in a previous image frame and the same in a current image frame, compare the difference with a predetermined threshold value, and determine whether error occurs in detecting the body in the current image frame according to the comparison result.

The processor is configured to: when error occurs in detecting the face and when error does not occur in detecting the body, calculate a travel path vector between the body in a previous image and the same in a current image frame using the extracted coordinates of the body, and correct the coordinate of the face using the calculated travel path vector in the current image frame.

The processor is configured to: correct the coordinate of the target object in the current image frame using a predetermined algorithm with at least one of color, hue, and edge of the target object.

The processor is configured to: measure a processing time of processing a first image frame of each scene; and adjust at least one of a resolution and a frames per second (FPS) for a second video based on the measured processing time.

The processor is configured to when error occurs in detecting the target object and when the processing time is slower than a predetermined threshold time, adjust a rendering schedule by skipping rendering of a predetermined number of image frames.

The processor is configured to detect a subtitle region from each image frame; convert the detected subtitle region based on the crop region; and combine the converted subtitle region to the crop region.

In accordance with another embodiment, a method may be provided for dynamically converting a video according to status changes. The method may include generating a request message for requesting a predetermined video to a contents server and transmitting the request message to the contents server through the communication circuit; receiving the requested video from the contents server in response to the request message through the communication circuit; detecting a target object from each image frame of the received video and define a region of interest based on the detected target object; determining whether error occurs in detecting the target object at each image frame and correct the region of interest when error occurs; defining a crop region based on the corrected region of interest; and converting the received video to a second video based on the crop region.

In accordance with still another embodiment, a non-transitory computer readable medium may be provided for storing computer readable instructions such that, when executed, cause a process of a computer to perform a method for dynamically converting a video according to status changes. The method may include generating a request message for requesting a predetermined video to a contents server and transmitting the request message to the contents server through the communication circuit; receiving the requested video from the contents server in response to the request message through the communication circuit; detecting a target object from each image frame of the received video and define a region of interest based on the detected target object; determining whether error occurs in detecting the target object at each image frame and correct the region of interest when error occurs; defining a crop region based on the corrected region of interest; and converting the received video to a second video based on the crop region.

DETAILED DESCRIPTION OF EMBODIMENTS

In accordance with one embodiment, a video displayed on a user device may be automatically, dynamically, and in real time, converted according to changes in a holding direction and a display direction of the user device. In accordance with another embodiment, a region of interest in a first video displayed on a user device may be identified and cropped as a crop region, and only the crop region may be displayed as a second video on the user device according to changes in status of the user device. In particular, video contents may be originally produced for displaying the video in a first display setting, and such video contents may be dynamically converted to be proper for displaying the video with a second display setting according to changes in at least one of a holding direction and a display direction of a user device.

In over to dynamically convert such video contents, user device 100 may determine a display setting of video received from contents server 200 and being displayed on user device 100, detect a holding direction and a display direction of user device 100, determine whether the display setting of video is proper to the detected holding direction and display direction of user device 100, and initiate a conversion operation when the display setting of the video is not proper to at least one of the holding direction and display direction of user device 100. As the conversion operation, user device 100 may detect at least one target object in each image frame, trace the detected target object along image frames of the video, detect and compensate errors in detecting the target objects, define a region of interest (ROI) in each image frame, define a crop region to include the ROI, adjusting one of FPS and resolution according to the delay caused by compensating the error, converting the display setting of video to properly render and display the crop region with the adjusted FPS and resolution, and continuously and seamlessly render and display the video based on the crop region and the converted display setting. In addition, user device 100 may perform post processes, such as rearranging a subtitle on a crop region and displaying a surface view of a target object on video.

In accordance with one embodiment, errors in detecting a target object may be compensated i) using a travel path vector between a secondary object in a previous image frame and the same in a current image frame, where the secondary object is an object closely related to the target object or ii) using a channel and spatial reliability tracking (CSRT) operation. Further, in accordance with one embodiment, a render schedule may be adjusted to compensate delay caused by error in detecting a target object by i) skipping rendering of image frames or ii) adjusting a frame rate (frames per second FPS) and resolution.

Figure 2:
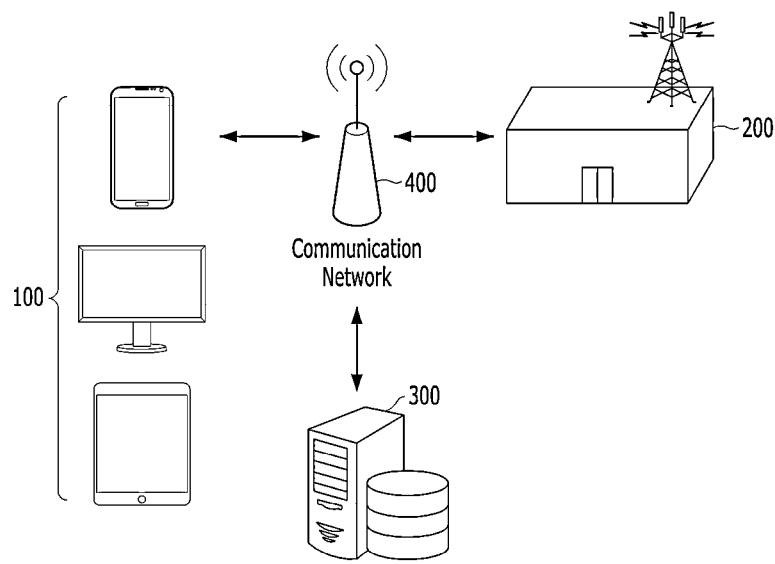
FIG. 2 is a diagram for describing dynamically converting video according to changes in status of a user device in accordance with an embodiment.

Hereinafter, an apparatus and method for dynamically converting video according to changes in status of a user device in accordance with one embodiment will be described with reference to FIG. 2. FIG. 2 is a diagram for describing dynamically converting video contents according to changes in status of a user device in accordance with an embodiment of the present disclosure.

Referring to FIG. 2, user device 100 may be connected to contents server 200 and subtitle server 300 through communication network 400 in accordance with one embodiment. User device 100 may communicate with contents server 200 and subtitle server 300 through communication network 400 by exchanging data (e.g., information) each other for dynamically converting video according to changes in a holding direction and a display direction of user device 100. In accordance with one embodiment, user device 100 may transmit a request message for predetermined video contents to contents server 200 and another request message for corresponding subtitle to subtitle server 300 and receive the requested video contents and subtitle from contents server 200 and subtitle server 300 through communication network 400. However, the embodiments are not limited thereto. For example, in accordance with another embodiment, user device 100 may transmit a request message for predetermined video contents to contents server 200, contents server 200 may transmit a request message for a corresponding subtitle to subtitle server 300, contents server 200 transmits the requested video contents to user device 100, and subtitle server 300 transmits the requested subtitle to user device 100.

Further, user device 100 may receive subtitles directly from contents server 200 with the requested video contents, instead of receiving the subtitle from subtitle server 300, or user device 100 may produce video contents and corresponding subtitle itself instead of receiving the video contents from contents server 200 and subtitle server 300 in accordance with still another embodiment.

Communication network 400 may be a data communication network that transmits digital data from one node to another using a variety of wired and wireless communication channel. For example, communication network 400 may connect user device 100, contents server 200, and subtitle server 300 through a wireless channel or a wire channel to enable them to communicate each other and to exchange data with each other. Communication network 400 may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto.

Contents server 200 may be a computer system that stores video contents and provides at least one of stored video contents to user device 200 according to a request in accordance with one embodiment. For example, contents server 300 may be a broadcasting server or a video on demand (VOD) server that broadcasts or provide video contents to subscribers through communication network 400. Contents server 200 may store a list of produced video streams and provide at least one video stream to a subscriber through a predetermined channel or through a predetermined graphic user interface. The contents may be video produced by a broadcasting company (e.g., Netflix®) or a producer (e.g., Universal Studio®), such as a movie, a broadcasting program, a game, and sports, or a one-person media which is produced by individual and uploaded at the video providing platform (e.g., YouTube®). Contents server 200 may provide subtitle with video content in general. However, the present disclosure is not limited thereto. Subtitle may be provided by an independent entity, such as subtitle server 300, as shown in FIG. 2.

Subtitle server 300 may be a computer system that stores subtitles of video contents and provide subtitles of the video contents to user device 100. Such subtitle may be produced by a person or automatically produced by artificial intelligence (AI).

User device 100 may be an electron device having i) communication capability for communicating with other devices through communication network 400 and receiving video contents and subtitiles from servers 200 and 300 and ii) processing capability for converting image frames of video contents, processing image frames of video contents, and reproducing and displaying the converted image frames of video contents. For example, user device 100 may include a smart phone, a tablet, a wearable device, and any portable devices equipping a processor, a memory a screen (e.g., monitor or display) and a communication module.

In accordance with one embodiment, user device 100 may perform the following operations for dynamically converting video according to changes in status of user device 100.

User device 100 may reproduce video requested by a user. For example, user device 100 may receive a user input for selecting a predetermined video and transmit a request message including information on the elected video to contents server 200 through communication network 400 and receive the requested video from contents server 200. The received video may be a first video produced to be displayed with a display aspect ratio of 16:9.

Figure 1A:
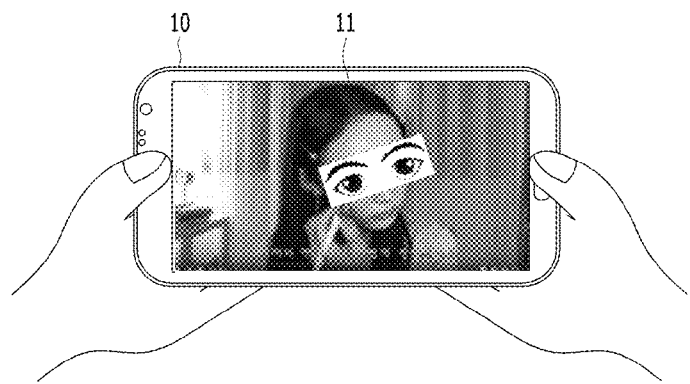
FIGS. 1A and 1B are diagrams illustrating a typical way of displaying video contents using a mobile device.
Figure 1B:
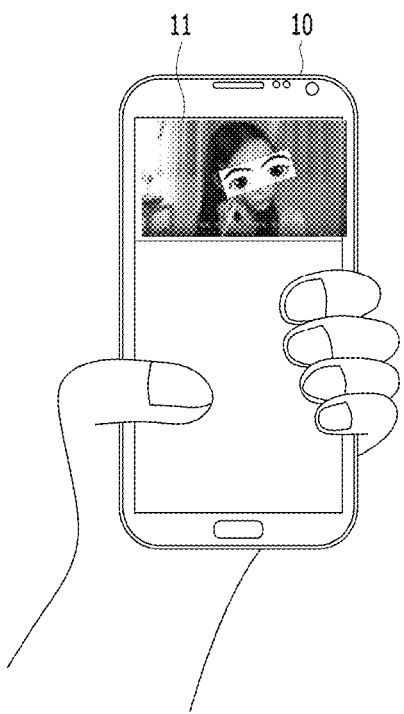

User device 100 may determine such a display setting of the first video received from contents server 200 and detect a holding direction and a display direction of user device 100. User device 100 may determine whether the display setting of video is proper to the detected holding direction and display direction of user device 100 and initiate a conversion operation when the display setting of the video is not proper to at least one of the holding direction and display direction of user device 100. For example, the received first video is produced to be displayed at the display aspect ratio of 16:9 and the landscape display direction (e.g., first display setting). When a user holds user device 100 horizontally and watches the first video as shown in FIG. 1A, the display setting of the first video is proper to user device 100's holding direction (e.g., horizontal direction) and display direction (e.g., landscape direction). However, when a user holds user device 100 vertically and watches the first video as shown in FIG. 1B, the display setting of the first video is not proper to user device 100's holding direction (e.g., vertical direction) and display direction (e.g., portrait direction). In this case, user device 100 may initiate the conversion operation in order to convert the first video to a second video which is proper to display with the holding direction and the display direction of user device 100 in accordance with one embodiment.

User device 100, as the conversion operation, may perform the following operations. User device 100 may detect at least one target object (e.g., face) in each image frame, extract information on a coordinate of the detected target object, and store the extracted information on the coordinate of the detected target object.

User device 100 may trace the detected target object along consecutive image frames of the video, continue extracting information on coordinates of the detected target object and secondary objects in each consecutive image frame, and store the extracted information on the coordinates of the detected target object and the secondary objects with information on the corresponding image frame.

Based on the coordinate information of the detected target object and secondary objects, user device 100 may detect and compensate errors in detecting the target objects. To detect whether error occurs in each image frame, user device 100 may calculate a distance between a target object in a current image frame and the same target object in a previous image frame and compare the calculated distance with a predetermined threshold value. If the distance is greater than the predetermined threshold value, user device 100 may determine that the error occurs at the current image frame.

To compensate the error, user device 100 may calculate a travel path vector of a secondary object (e.g., body) closely related to the target object (e.g., face) in a previous image frame to the same secondary object in a current image frame and compensate the coordinate of the target object in the current image frame based on the calculated travel path vector in accordance with one embodiment. Furthermore, user device 100 may perform a channel and spatial reliability tracking (CSRT) operation with at least one of color, hue, and edge of the target object and compensate the coordinate of the target object based on the result of the CSRT operation in accordance with another embodiment. In addition, user device 100 may use both of the travel path vector of the second object and the CSRT operation together for correcting the error in accordance with still another embodiment.

User device 100 may define a region of interest (ROI) in each image frame. For example, the ROI may be defined based on i) a user input that indicates a size and a shape of the ROI or ii) a deep learning operation.

User device 100 may define a crop region to include the ROI. User device 100 may adjust one of FPS and resolution according to the delay caused by compensating the error. User deice 100 may convert the display setting of videos to properly render and display the crop region with the adjusted FPS and resolution. User device 100 may continuously and seamlessly render and display the video based on the crop region and the converted display setting. User device 100 may perform post processes, such as rearranging a subtitle on a crop region and displaying a surface view of a target object on video.

Figure 3:
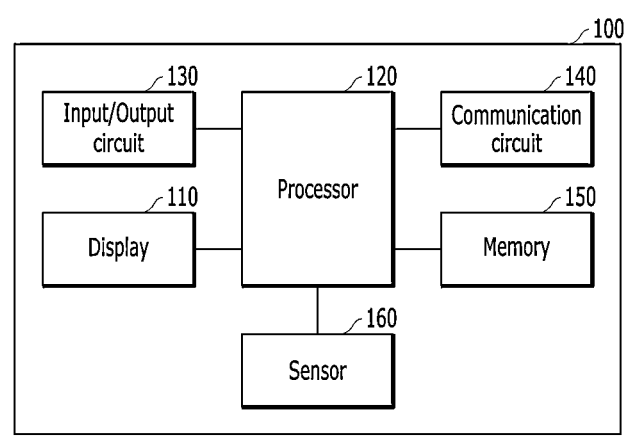
FIG. 3 is a block diagram showing a user device for dynamically converting video according to status of the user device in accordance with an embodiment.

Hereinafter, hardware and software structure of user device 100 will be described in more detail with reference to FIG. 3. FIG. 3 is a block diagram illustrating hardware and software structure of a user device in accordance with one embodiment. As described, User device 100 may be an electron device having i) communication capability for communicating with other devices through communication network 400 and receiving video contents from servers 200 and 300 and ii) processing capability for converting image frames of video contents, processing image frames of video contents, and reproducing (e.g., rendering) and displaying the converted image frames of video contents. For example, user device 100 may include a smart phone, a tablet, a wearable device, and any portable devices equipping a processor, a memory a screen (e.g., monitor or display) and a communication module.

Referring to FIG. 3, user device 100 may include display 110, processor 120, input circuit 130, communication circuit 140, memory 150, and sensor 160 in accordance with one embodiment. Display 110 may include a display panel and a circuit for controlling the display panel for visually outputting information processed by processor 120. For example, display 110 may display image frames of video contents received from contents server 200 according to a display setting, processed under the control of processor 120 in accordance with one embodiment. For example, display 110 may receive image frames of video contents from processor 120 and display the received image frames according to display setting adjusted according to at least one of a holding direction and a display direction of user device 100. For example, display 110 may be a liquid crystal display (LCD) panel, light emitting diode (LED) panel, organic light emitting diode (OLED) pane, or an active-matrix organic light-emitting diode (AMOLED) panel, but the present invention is not limited thereto.

Display 110 may include a touchscreen panel that receives a user input that indicates or points single or multiple target objects in a displayed image frame in accordance with at least one embodiment. In this case, such a touchscreen panel may be coupled to and cooperate with input circuit 130. Furthermore, display 100 may receive user inputs for defining a size and a shape of a region of interest (ROI) or a crop region in accordance with one embodiment.

Input circuit 130 may be a user interface for receiving input from a user. For example, input circuit 130 may include any of a keypad, a dome switch, a touch pad, a jog wheel, and a jog switch, but is not limited thereto. Further, input circuit 130 may include several hardware key buttons. The hardware key buttons may include a hold key and a volume control button. Furthermore, user device 100 may include a touch screen panel (not shown) as another input unit for receiving touch inputs in accordance with at least one embodiment. The touch screen panel (not shown) may be disposed on an upper surface of display 110, but the embodiments are not limited thereto. Input circuit 130 may be configured to receive various user inputs from a user, for example, user inputs for indicating a target object among objects in displayed image frames and for indicating a size and a shape of a region of interest (ROI) and a crop region in accordance with one embodiment.

Sensor 160 may detect current status of user device 100. In accordance with at least one embodiment, sensor 160 may sense a holding direction of user device 100. The holding direction may be referred to as a standing direction or a laying direction that indicates whether user device 100 is haled, laid, or stood in a horizontal direction or a vertical direction. Sensor 160 may generate a sensing signal indicating one of the horizontal direction and the vertical direction of user device 100 and transmit the sensing signal to processor 120. Sensor 160 may also detect changes in the holding direction, generate a sensing signal indicating the changes in the holding direction, and transmit the generated sensing signal to processor 120.

Memory 150 may store a variety of information, such as software programs for operation, data received from other entities, and data generated as result of operations. That is, memory 150 may store an operation system data, applications, and related data, received from other entities through a variety of communication media (e.g., communication networks). Memory 150 may include at least one of an internal memory and an external memory according to embodiments. For example, memory 150 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Communication circuit 140 may communicate with other entities including contents server 200, subtitle server 300, or another user device (not shown) through communication network 400. For example, communication circuit 140 may transmit a request of predetermined video contents to at least one of contents server 200 and subtitle server 300, receive the requested video contents from one of contents server 300 and subtitle server 300, deliver the received video contents to processor 120 or store in memory 150 in response to control of processor 120.

Communication circuit 140 may include at least one circuitry module (or at least one circuit) for communicating with other entities through communication network 400.

Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TIS-PAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiment, communication circuit 1300 may include at least one of a wireless communication circuit and a wired communication circuit. Herein, the wireless communication circuit and wired communication may be separately or integrally configured.

Processor 120 may perform or control overall operation of user device 100. For example, processor 120 may be a central processing circuitry that controls constituent elements (e.g., memory, communication circuit, display, sensor, etc.) of user device 100 and/or performs a variety of operations (or functions) of user device 100 for dynamically converting video according to changes in status of user device 100. Processor 120 may be a set of processors, such as a dedicated processing circuit for image processing, or independent image processor.

Processor 120 may include circuit blocks each dedicated to perform assigned operations, such as i) determining a display setting of video received from contents server 200 and being displayed on user device 100, ii) detecting a holding direction and a display direction of user device 100, iii) determining whether the display setting of video is proper to the detected holding direction and display direction of user device 100, and iv) initiating a conversion operation when the display setting of the video is not proper to at least one of the holding direction and display direction of user device 100. As the conversion operation, processor 120 may include circuits blocks each dedicated to perform assigned operation, such as a) detecting at least one target object in each image frame, b) tracing the detected target object along image frames of the video, c) detecting and compensating errors in detecting the target objects, d) defining a region of interest (ROI) in each image frame, e) defining a crop region to include the ROI, f) adjusting one of FPS and resolution according to the delay caused by compensating the error, e) converting the display setting of video to properly render and display the crop region with the adjusted FPS and resolution, f) continuously and seamlessly rendering and displaying the video based on the crop region and the converted display setting, and g) performing post processes, such as rearranging a subtitle on a crop region and displaying a surface view of a target object on video.

Figure 4:
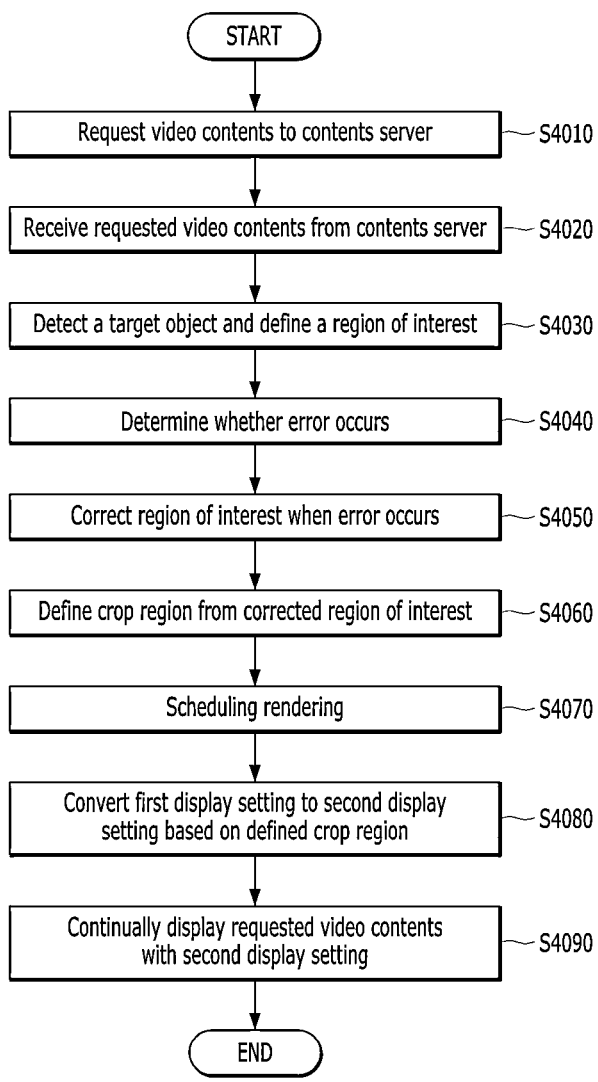
FIG. 4 is a flowchart illustrating a method for dynamically converting video according to status of the user device in accordance with an embodiment.

Hereinafter, operations of user device 100 will be described in more detail with reference to FIG. 4. FIG. 4 is a flowchart illustrating a method of dynamically converting video being displayed on a user device according to changes in a holding direction and a display direction of the user device and continuously displaying the video without interruption in accordance with one embodiment.

Referring to FIG. 4, predetermined video contents may be requested to contents server 200 at step S4010. In accordance with at least one embodiment, user device 100 may generate and display a graphic user interface for selecting video contents by executing a predetermined application stored in memory 150. Through the graphic user interface displayed on display 110, user device 100 may receive a use input to select video contents from a user, generate a request message including information on the selected video contents, and transmit the request message to contents server 200 through communication circuit 140. However, the embodiments are not limited thereto. For example, using the graphic user interface, a user may select one of video contents stored in memory 150 in accordance with another embodiment. The video contents stored in memory 150 may be produced by individual including an owner of user device 100 or previously received from others and stored at memory 150.

At step S4020, the requested video contents may be received from contents server 200 through communication network 400 in response to the request message. For convenience of describing and ease of understanding, the requested video contents are referred to as first video, hereinafter. In accordance with at least one embodiment, in response to the request message, user device 100 may receive the first video through real-time streaming or video on demand (VoD) stream from contents server 200.

The first video is produced and encoded to have a first display setting. The first display setting may be also referred to as a first display property or a default display setting. For example, the first display setting may include a display aspect ratio of 16:9, a display orientation of a landscape, and a resolution of high definition (HD). That is, the first video is produced to be displayed at the display aspect ratio of 16:9, a display orientation of a landscape, and a HD resolution.

In general, a user turns and holds user device 100 sideway to obtain the optimal viewing experience of the first video. In this way, the user may be able to watch the first video with full screen of display 110 as shown in FIG. 1A. That is, the first display setting of the first video is matched with the display direction and the holding direction of user device 100. However, the user may want to turn user device 100 vertically for holding user device 100 with one hand as shown in FIG. 1B. Because of the first display setting of the first video, user device 100 displays the first video in a partial screen as shown in FIG. 1B. That is, the display direction and the holding direction of user device 100 is not proper to provide the optimal viewing experience of the first video because the first display setting is not matched with the display direction and the holding direction of user device 100.

Figure 15B:
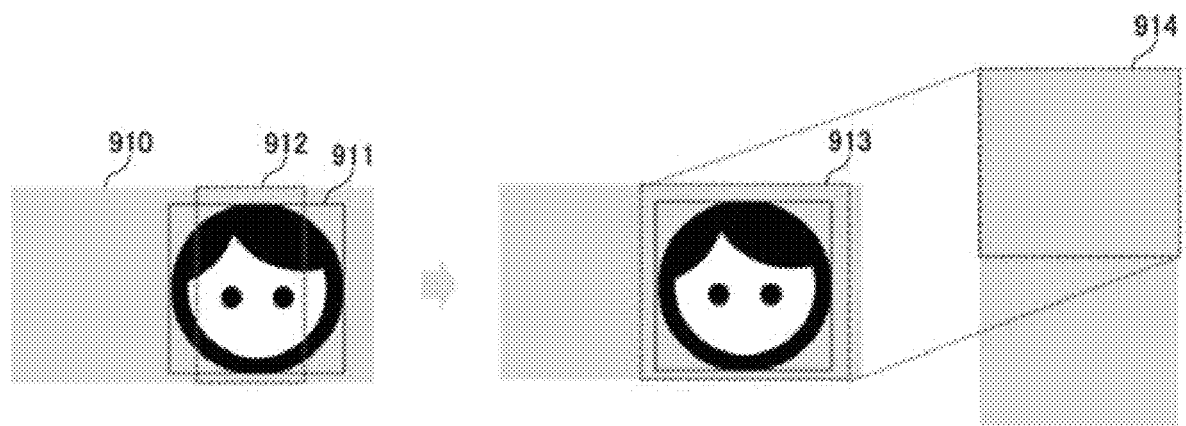
Figure 15C:
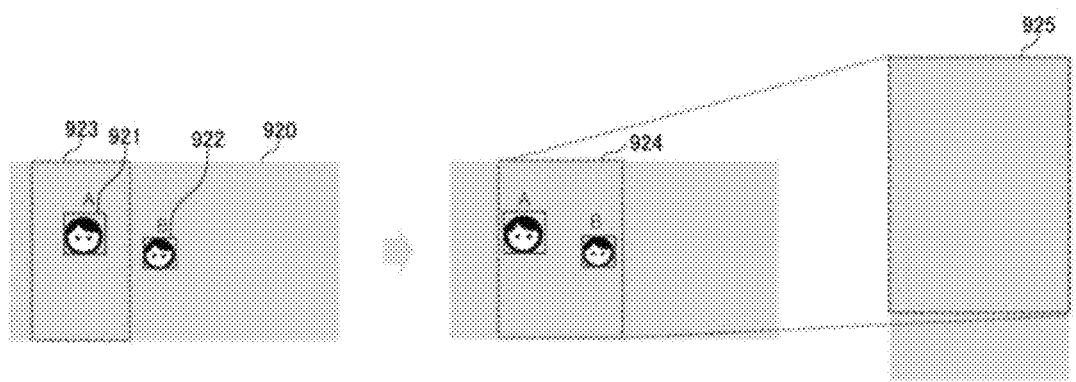
Figure 15D:

In accordance with at least one embodiment, the first video may be converted to a second video according to changes in the holding direction and the display direction of user device 100 as shown in FIG. 15D. In order to convert the first video to the second video, a target object may be detected from each image frame of the first video, a region of interest (ROI) may be defined based on the detected target object, and the target object with the region of interest may be traced through consecutive image frames of the first video at step S4030.

In accordance with one embodiment, the target object may be indicated by a user input or assigned by a producer of the first video. For example, user device 100 may receive a user input to assign a target object in each image frame from a user. Alternatively, user device 100 may determine the target object without receiving the user input from the user. As another example, the target object may be assigned by the producer of the video contents. The producer of the video contents may select or assign one of objects in each image frame as a target object for emphasizing a story of the video contents or advertising the object because of promotion or commercial reason. In this case, at least one image frame of video contents may include information on the target object which is assigned by the producer of the video contents, and user device 100 may obtain the information on the target object from at least one image frame of video contents and detect the target object from each image frame. Furthermore, multiple objects may be assigned or selected as target objects. In addition, single or multiple secondary objects may be assigned or selected as an object closely related to a corresponding target object. For example, if a target object is a face, a secondary object is a body connected to the face.

Based on the received input, user device 100 may perform operation for detecting a target object in each image frame of video contents and defining a region of interest (ROI) based on the detected target object. The ROI may be defined to include the target object. In case of multiple target objects detected, the ROI may be defined to include all the target objects. In accordance with at least one embodiment, the region of interest may be set or defined based on inputs from the user or using a deep learning techniques In accordance with one embodiment, user device 100 may perform operations for tracing the target object along consecutive image frames of video contents and extract (e.g., obtain) information on coordinates of the traced target object from each image frame of the video contents. User device 100 may store the extracted information on the coordinate of the traced target object at each image frame in a predetermined section (e.g., cash) of memory 150.

For example, user device 100 may identify a face as a target object from an image frame and extract information on coordinates of the detected face. As another example, user device 100 may detect a body as a target object from each image frame and extract information on coordinates of the detected body. In accordance with another embodiment, user device 100 may identify a target object assigned by a user input or a producer and also identify a second object which is closely related to the target object and extract information on center coordinates of the identified target object and second object together with information on how those objects are related to each other. The embodiments of the present disclosure are not limited to the number of objects that user device 100 identifies and extract information thereon. Such a number of objects may be determined according to various factors, such as a processing power of user device 100 and a type of video contents.

After detecting the target object, user device 100 may define a region of interest based on the detected target object and trace the target object with the region of interest (ROI) in image frames of the first video. Furthermore, user device 100 may store information on results of detecting the target object from each image frame, defining the ROI, and obtaining a center coordinate of the target object in each image frame.

Figure 10:
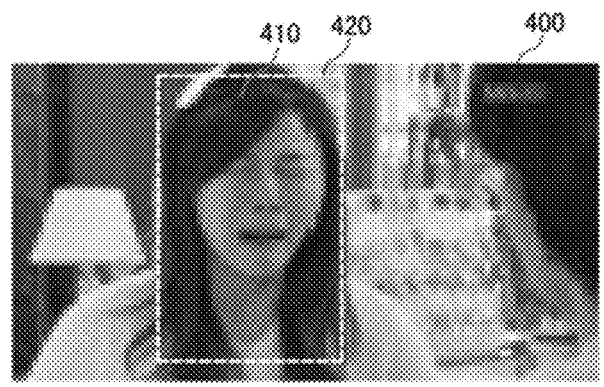
FIG. 10 is a diagram showing a target object and a region of interest (ROI) defined based on the target object in accordance with one embodiment.

For example, FIG. 10 is a diagram showing a target object and a region of interest (ROI) defined based on the target object in accordance with one embodiment. Referring to FIG. 10, user device 100 may identify a face 410 of a female actor as a target object and define a region of interest 420 based on the identified face 410.

At step S4040, user device 100 may determine whether error occurs while tracing the detected target object through consecutive image frames. In accordance with one embodiment, user device 100 may perform operations for determining whether error occurs during tracing and detecting a target object from each image frame of the received first video and compensating (e.g., correcting) the region of interest (ROI) in the image frame where the error occurs.

For example, in case of a face assigned as a target object, user device 100 extracts coordinate information of the face and determines whether a scene is changed between adjacent image frames. If the scene is not changed, user device 100 determines whether a distance between the face in a current image frame and the same face in a previous image frame is greater than a predetermined threshold value based on the extracted and stored coordinate information of the face in the current image frame and the previous image frame. Based on the determination, user device 100 may determine whether errors occur in detection. That is, when the distance is greater than the threshold value, user device 100 determines that a wrong object is detected as the target object in the current image frame.

When user device 100 detects errors, user device 100 may correct (e.g., compensate) the coordinate information of the face in the current image frame where error occurs. In accordance with one embodiment, when error occurs during tracing and detecting the face as the target object, user device 100 may use a secondary object which is closely related to the target object (e.g., face), to compensate the errors. For example, user device 100 may identify a body connected to the face in a previous image frame, extract information on coordinates (e.g., center coordinate) of the body from the previous image frame and the current image frame and calculate a travel path vector between the body in the previous image frame and the same body in the current image frame. Using the calculated travel path vector, user device 100 may correct (e.g., compensate) the coordinates of the face and redefine the ROI accordingly.

Figure 11A:
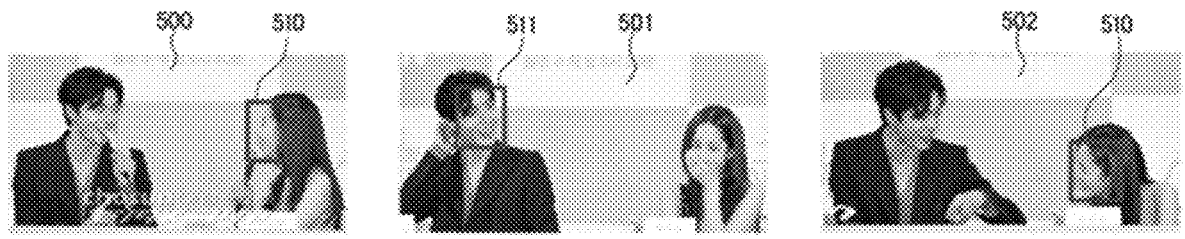
FIG. 11A to FIG. 11C are diagrams showing detecting errors in identifying a target object and correcting the detected errors in accordance with at least one embodiment.
Figure 11B:
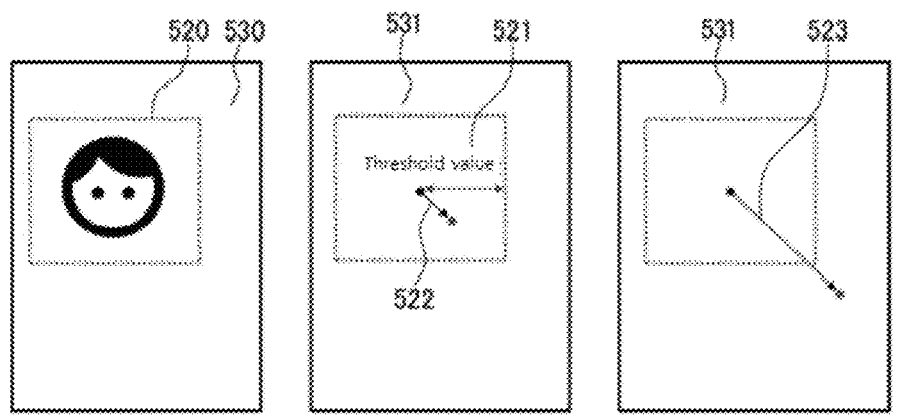
Figure 11C:
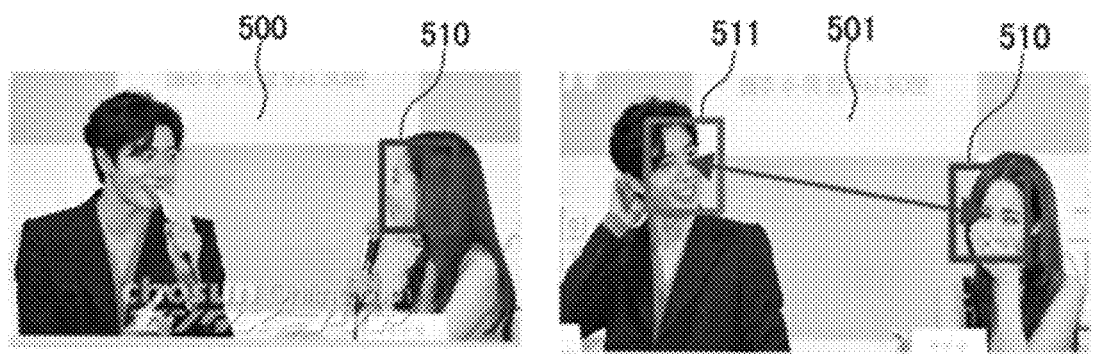

FIG. 11A to FIG. 11C are diagrams showing detecting errors in identifying a target object and correcting the detected errors in accordance with at least one embodiment. In particular, FIG. 11A shows i) detecting a target object in a first image frame 500, ii) error occurring in detecting the target object in a second image frame 501, and iii) correcting the error in a third image frame 503. Referring to FIG. 11A, a first image frame 500 (e.g., $n^{th}$ image frame) shows that a face of a female actor is detected as a target object, and a region of interest 510 is defined based on the detected face. A second image frame 501 (e.g., $(n+1)^{th}$ image frame) shows that a face of an male actor is detected as a target object, and a ROI 511 is defined based on the detected face of the male actor. That is, an error occurs in detecting the face of the female actor at the second image frame 501. Such an error may occur because the female actor hides her face by her hand, as shown in the second image frame 501.

In accordance with one embodiment, the error occurring in the second image frame may be detected by calculating a distance from a center coordinate of the face in the ROI 510 in the first image frame 510 to a center coordinate of the face in the ROI 511 in the second image frame 501 and comparing the calculated distance with a predetermined threshold value, as shown in FIG. 11B.

FIG. 11B is a diagram for explaining how to detect errors in identifying a target object in accordance with at least one embodiment. Referring to FIG. 11B, at first, user device 100 may determine whether a scene is changed between a first image frame (e.g., previous image frame) 530 and a second image frame (e.g., current image frame) 531. When the scene is not changed, user device 100 may calculate a difference between a coordinate value (e.g., center coordinate value) x of a target object in a ROI 520 defined based on a detected target object (e.g., face) in the previous image frame 530 and the same y in the current image frame 531 and determine whether the difference is greater than a predetermined threshold value or not.

When the difference is smaller than the predetermined threshold value as shown in the second image frame 531, user device 100 may determine that error does not occur in detecting a target object. When the difference is greater than the predetermined threshold value as shown in the third image frame 531, user device 100 may determine that error occurs in detecting the target object.

The predetermined threshold value may be set differently according to a type of a target object and a type of contents. For example, when the target object is a person, the predetermined threshold value may be defined as about 30 Pixels in accordance with at least one embodiment. Further, instead of a center coordinate of a target object, a center coordinate of a ROI may be used to detect error and calculate a travel path distance.

FIG. 11C illustrates correcting error of detecting a target object in accordance with at least one embodiment of the present disclosure. User device 100 may correct the coordinate information of the face at an image frame where the errors occurred (e.g., the error detected).

In accordance with one embodiment, the error in detecting a target object may be compensated by i) using a travel path vector between a secondary object in a previous image frame and the same in a current image frame or ii) using a CSRT algorithm.

Figure 12:
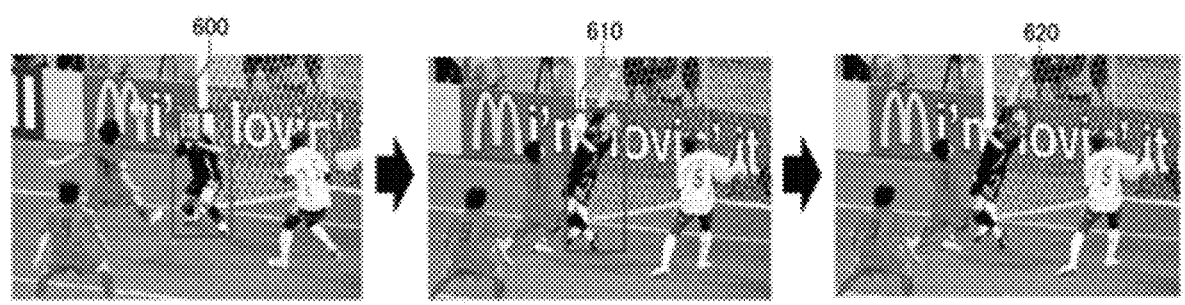
FIG. 12 shows an example of correcting error using a travel path vector of a secondary object closely related to a target object in accordance with one embodiment.

FIG. 12 is a diagram for showing correcting error using a travel path vector of a secondary object closely related to a target object in accordance with one embodiment. For example, user device 100 may detect a secondary object of the target object at each image frame, obtain coordinate information (e.g., center coordinate) of the secondary object, and store the obtained coordinate information at memory 150. User device 100 may calculate a difference of the coordinate information of the secondary object between adjacent image frames, determine whether the calculated difference is greater than a predetermined threshold or not, and determine whether errors occur in the target object detection based on the determination When error occurs, user device 100 may obtain a travel path vector of the secondary object by comparing coordinate information of the secondary object between adjacent image frames and correct coordinate information of a target object based on the travel path vector at a current image frame where error occurs in detecting the target object.

As shown in FIG. 12, a first image frame shows that a face and a body are detected as a target object and a secondary object and a region of interest 600 is defined based on the detected face and body. A second image frame shows that error occurs in detecting the face. That is, no face is detected in the second image frame. In this case, user device 100 may compare coordinate information (e.g., center coordinate) of the body (e.g., secondary object) between the first image frame and the second image and calculate a travel path vector of the body based on the comparison result.

User device 100 may predict coordinate information of the face in the third image frame based on the obtained travel path vector and the coordinate information of the face in the first image frame (n) and correct the area of the interest at the current image frame based on the predicted coordinate information of the face.

Figure 13:
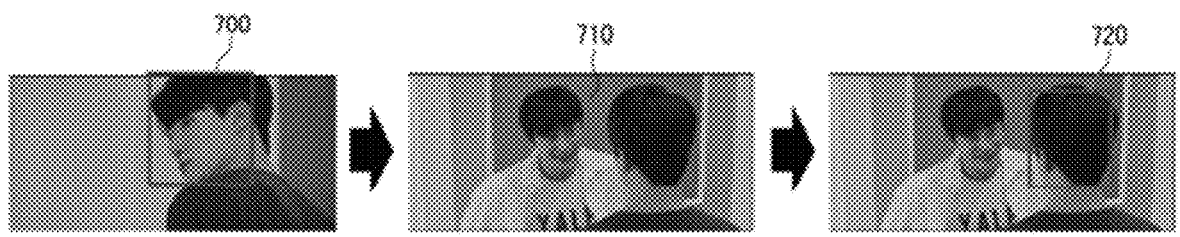
FIG. 13 illustrates a process of compensating a region of interest at a current image frame using a predetermined algorithm in accordance with at least one embodiment.

As described, the channel and spatial reliability tracking (CSRT) function may be used to correct errors in detecting a target object in accordance with one embodiment. Since it might take more time to perform the CSRT function, the CSRT function may be used if error also occurs in detecting the secondary object. FIG. 13 is s a diagram for showing correcting error using a CSRT algorithm in accordance with at least one embodiment. Referring to FIG. 13, a first image frame shows that a face of a male actor is detected and a region of interest (ROI) 700 is defined. A second image frame shows that errors occur during the object detection. Further, the scene is changed in the second image frame. Accordingly, it is impossible to use the secondary object to correct the error. In this case, user device 100 may apply a channel and spatial reliability tracking (CSRT) function with coordinate information of the face in the ROI 700 at the first image frame. A third image frame shows that the ROI 720 is redefined by correcting error using the CSRT. The CSRT is a tracking algorithm that tracks a target object by building a map using a predetermined weight of a target object defined as a region of interest. In generally, the CSRT algorithm performs i) generating a spatial confidence map, ii) learning a limited correlation filter, and iii) estimating a channel reliability. User device 100 may predict and correct coordinate information of the face at the third image frame using the result of applying the CSRT algorithm with various information such as color, hue, and edge of the selected region of interest.

The above embodiments were described as individually using the travel path vector and the CSRT. However, the embodiments are not limited thereto. For example, error in identifying a target object and a region of interest may be corrected using both of the travel path vector and the CSRT function together. Such an error correction method will be described in more detail with reference to FIG. 6.

At step S4050, the region of interest may be corrected when the error occurs in detecting the target object. For example, user device 100 may correct the region of interest (ROI) based on the corrected coordinate of the target object when the error occurs in detecting the target object. In accordance with one embodiment, such a region of interest (ROI) may be manually defined by a user input. In this case, a shape and a size of the ROI may be determined based on the detected target object and the user inputs that indicate the shape and the size. User device 100 may perform tracking the target object through comparing image frames based on the defined ROI and extract a center coordinate (center (x,y)) of the traced target object (or ROI). User device 100 may perform a CSRT algorithm based on the extracted center coordinate and the defined ROI and extract the next coordinate based on the performance result (e.g., CSRT algorithm result). Such a method of manually defining the ROI may be proper to game contents or one person video (e.g., one person broadcasting show).

In accordance with another embodiment, the ROI may be automatically defined by using a deep learning method. In this case, user device 100 may detect target objects in each image frame, such as a face, an animal, or a thing, using a detection algorithm (e.g., a deep learning algorithm). User device 100 may trace the target objects through image frames and extract center coordinates of the traced target objects. Based on the detecting result, user device 100 may define the ROI using the deep learning. Such a deep learning-based method may be proper to drama or movie where includes a lot of scene changes.

At step S4060, a crop region may be defined from the corrected region of interest. For example, user device 100 may determine a crop region in an image frame based on the corrected (compensated) region of interest. In accordance with one embodiment, user device 100 may use the following equation Eq. 3 to define a crop region when the target object and the ROI are manually detected based on the user input.

$$\text{start}(x,y)=((\text{center\_}x-303.75),0)$$

$$\text{end}(x,y)=((\text{center\_}x+303.75),1920) \qquad \text{Eq. 3}$$

In Eq. 3, center_x denotes a center coordinate of the extracted target object. Further, Eq. 3 is generated based on assumption in a display aspect ratio of 16:9 and a resolution of 1920:1080. For example, FIG. 15A to FIG. 15D are diagrams showing defining a crop region in accordance with one embodiment. As shown in FIG. 15A, the crop region 903 is defined based on a center coordinate 901 of a target object 902 in a first video 900 using Eq. 3. Furthermore, the crop region 903 may be also defined based on the holding direction and the display direction of user device 100. That is, when user device 100 is held vertically by one hand as shown in FIG. 1B, the crop region 903 may be defined based on a vertical holding direction and a portrait display direction of user device 100. The crop region 903 may be displayed as a second video 904, as shown in FIG. 15A.

In accordance with another embodiment, a crop region may be automatically defined when a region of interest is defined using a deep learning technology, as shown in FIG. 15B. In this case, the crop region may be defined using the following equation Eq. 4.

$$\text{start}(x,y)=((\text{center\_}x-\text{RoI\_}x/2-\text{margin}),0)$$

$$\text{end}(x,y)=((\text{center\_}x+\text{RoI\_}x/2+\text{margin}),1920) \qquad \text{Eq. 4}$$

In Eq. 4, RoI_x is a horizontal length of the region of interest. By using Eq. 4, the crop region 914 may be defined to include the region of interest 911, and a display aspect ratio may be defined according to the crop region 914. Such a defined crop region and display ratio may be maintained until a scene is changed when the size of the target object is bigger than a predetermined size. As shown in FIG. 15C, the crop region 913 may be displayed in or as a second video 914 on user device 100.

In still another embodiment, a crop region may be defined to include a plurality of target objects as shown in FIG. 15C. When multiple target objects 921 and 922 are detected in an image frame 920, a crop region may be defined to include the multiple target objects 921 and 922 together or defined to include one of the target objects 921 and 922 according to various factors including a user selection or characteristics of the video.

In case of including the multiple target objects, a crop region may be defined using the following equation Eq. 5.

$$\text{start}(x,y)=((\text{center\_}x\_A-\text{RoI\_}x\_A/2-\text{margin}),0)$$

$$\text{end}(x,y)=((\text{center\_}x\_B+\text{RoI\_}x\_B/2+\text{margin}),1920) \qquad \text{Eq. 5}$$

In Eq. 5, center_x_A is a x value of a center coordinate of an object A, and RoI_x_A denotes a length of region of interest of the object A. As shown in FIG. 15C, the crop region 924 is defined to include target objects A and B using Eq. 5, a display setting of the defined crop region 924 may be changed according to the holding direction and the display direction of the user device 100, and the defined crop region 924 may be displayed on user device 100 as a second video 925 according to the changed display setting.

At step S4070, a render schedule is adjusted according to error occurred in detecting a target object. For example, user device 100 may reschedule the rendering timing of each image frame after correcting errors in detecting the target objects to compensate the delay caused by the error correction operation. For rescheduling, user device 100 may i) skip redarning image frames or ii) adjust at least one of a frames-per-second (FPS) and a resolution in accordance with one embodiment.

Figure 14A:
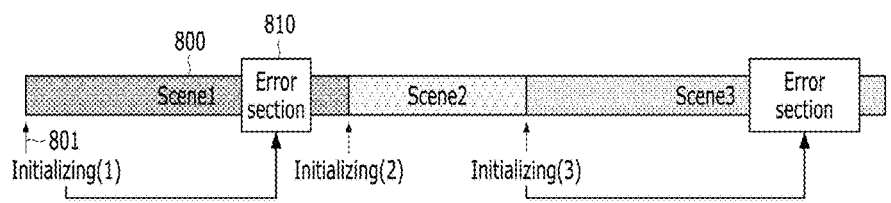
FIG. 14A to FIG. 14D are diagrams for describing adjusting a render schedule in accordance with one embodiment.
Figure 14B:
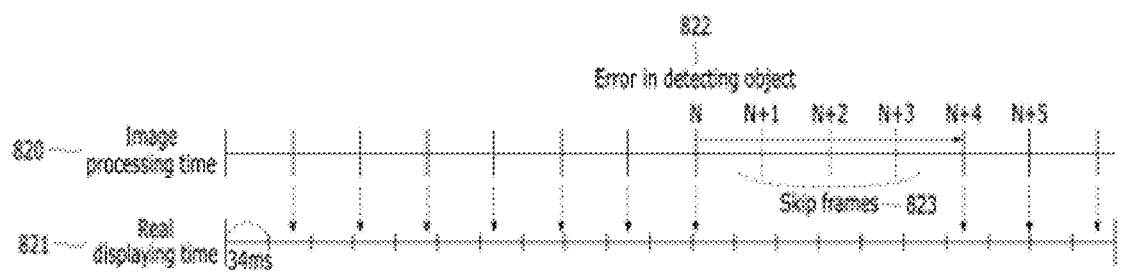
Figure 14C:
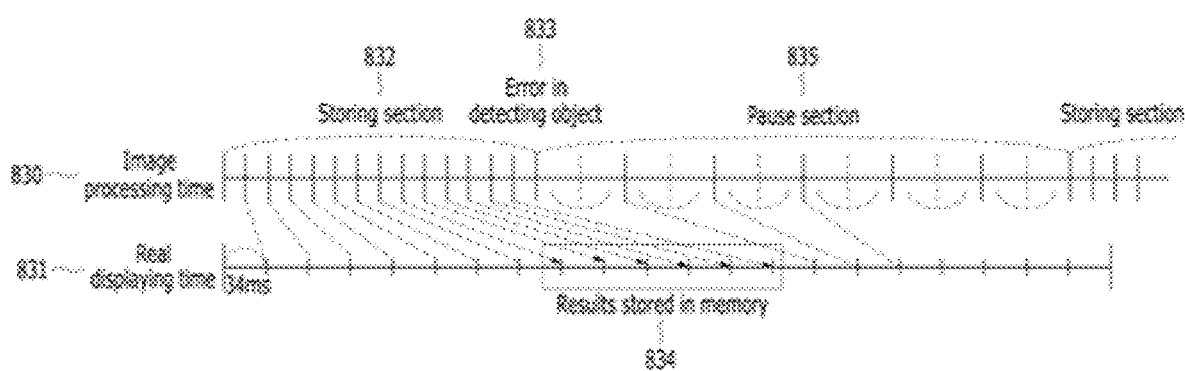
Figures 14D, 15A:
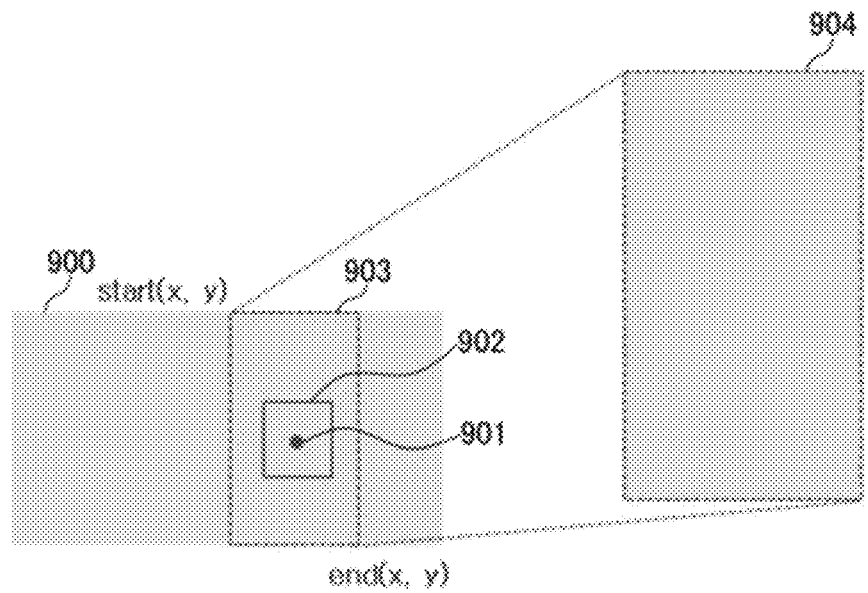
FIG. 15A to FIG. 15D are diagrams showing defining a crop region in accordance with one embodiment

FIG. 14A to FIG. 14D are diagrams for describing adjusting a render schedule in accordance with one embodiment. FIG. 14A is a diagram for explaining an initializing operation in accordance with one embodiment. Referring to FIG. 14A, user device 100 may perform an initializing operation 801 on a first image frame of each scene 800. That is, when a scene is changed, user device 100 may perform the initializing operation on the first image frame of the changed scene.

As the initializing operation, user device 100 may measure a time of processing a first image frame (e.g., image processing time) and a time spending for detecting objects including a target object and secondary objects in the first image frame. According to the measured processing times, user device 100 may i) keep the original render timing, ii) skip rendering image frames, and ii) adjust at least one of a resolution and a frames per second (FPS) of the second video in accordance with one embodiment.

For example, if the measured image processing time is faster than a predetermined image processing time (e.g., 30 frames per second), user device 100 may keep an original rendering time. If the measured image processing time becomes slower than the predetermined image processing time (e.g., 30 frames per second) because of error occurred in detecting target objects, user device 100 may skip rendering of N image frames or adjust at least one of the FPS and the resolution to be proper to the measured image processing time.

For example, when errors occur during the object detection 810 as shown in FIG. 14A, user device 100 may i) skip rendering at least one of image frames according to whether the image processing time is greater than a reference image processing time or not as shown in FIG. 14B or ii) adjust rendering scheduling of at least one image frame based on the number of stored coordinate information of the target object as shown in FIG. 14C.

User device 100 may adjust a frame rate (FPS) of each scene using at least one of i) a time spent for correcting error using coordinate information of a target object (e.g., correcting a coordinate value of a region of interest), ii) a time spent for correcting error using coordinate information of a secondary object, which is clearly related to a target object, and iii) a time spent for correcting error using a CRST operation. Hereinafter, the frame rate (FPS) is about 1/(image processing time).

According to the time for correcting error, user device 100 may classify a processing time of a first image frame into i) shorter than 0.034 second (30 frames) and ii) longer than 0.034 second and adjust the resolution and FPS of the second video differently according to the classified processing time. Such an operation for adjusting a render schedule will be described in detail with FIG. 7 and FIG. 8 later again.

At step S4080, the first display setting may be converted to second display setting based on the defined crop region and the adjusted render schedule. For example, user device 100 may convert the first display setting (e.g., original display setting) to the second display setting in order to properly display the crop region on display 110 according to the changed holding direction and display direction. For example, the display setting is converted to display the crop region to occupy an entire screen according to the changed holding direction and display direction. As shown in FIG. 15D, the display setting is changed to include a display aspect ratio of 9:16, a resolution of HD, and a portrait display direction.

At step S4090, the crop region may be continuously and seamlessly displayed as a second video with the second display setting. For example, user device 100 may continuously display the crop region as the second video with the second display setting.

Figure 5:
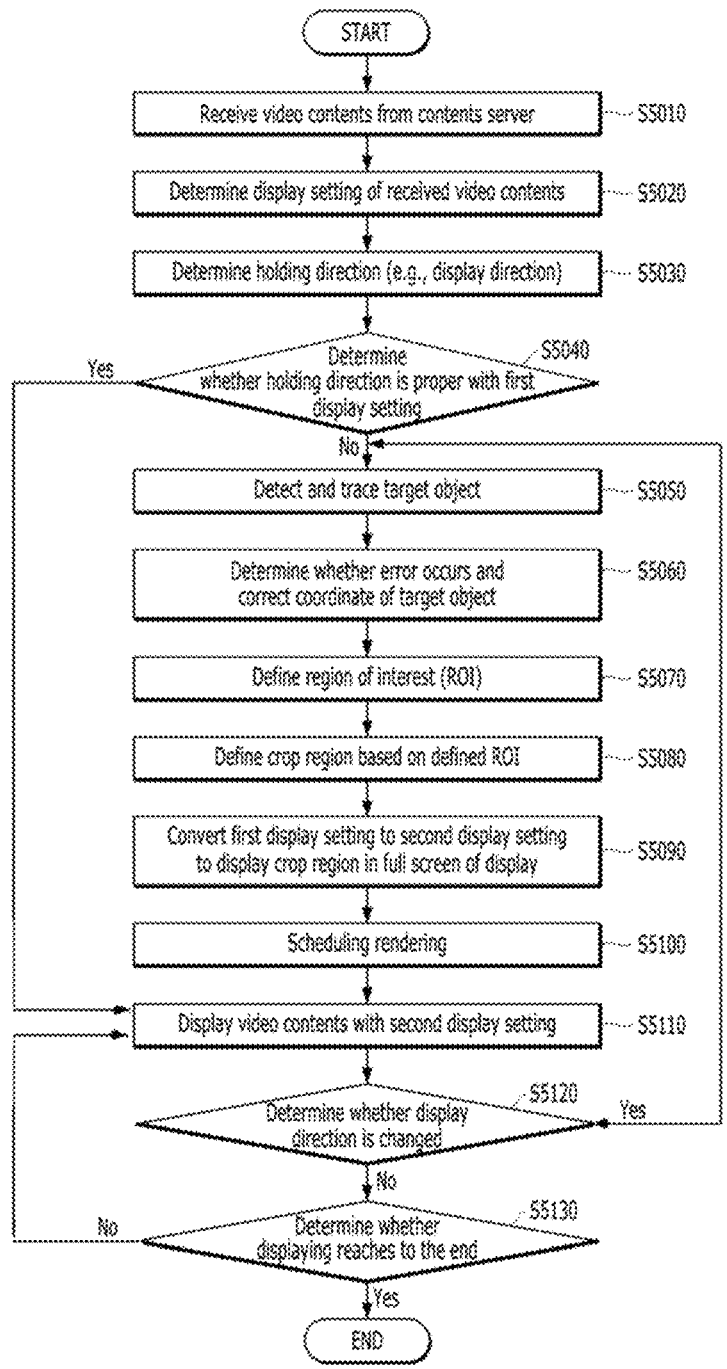
FIG. 5 is a flowchart illustrating a method for dynamically converting video according to status of the user device in accordance with another embodiment.

Hereinafter, dynamically converting video being displayed on a user device according to changes in a display direction and a holding direction of the user device in accordance with another embodiment will be described in detail with reference to FIG. 5. For convenience and ease of understanding, the embodiment will be described with assumption that a user uses a smart phone as a user device for watching video contents streamed from contents sever. FIG. 5 is a flowchart illustrating a method for dynamically converting video according to changes in a holding direction and a display direction of a user device in accordance with another embodiment.

Referring to FIG. 5, user device 100 may receive video contents from contents server 200 at step S5010. For example, a smart device may provide a graphic user interface to a user to select one of video contents, receive a user input to select predetermined video contents, generate a message including information on the selected video contents, and transmit the generated message to contents server 200 through communication network 400. In response to the request message, the smart phone (e.g., user device 100) may start receiving the requested video contents produced and encoded to have a default display setting (e.g., first display setting) and sequentially process, render, and display image frames of the received video according to the first display setting on display 110 of user device 100.

At step S5020 user device 100 may determine the first display setting of the received video. For example, user device 100 may obtain or extract information on the first display setting of the received video from the received video. For example, the first display setting may include the display aspect ratio of 16:9, a landscape display direction, and a HD resolution. In order to get the optimal view experience, the user may need turn and hold user device 100 sideway and watch the video contents horizontally as shown in FIG. 1A.

At step S5030, user device 100 may determine a holding direction and a current display direction. For example, user device 100 may determine a current status of the holding direction and the current display direction. As described, the received video contents may have the first display setting (e.g., default display setting: aspect ratio of 16:9, and display direction: landscape). However, the holding direction and the display direction of user device 100 may be a vertical holding direction and a portrait display direction, which are not proper to the first display setting of the received video contents as shown in FIG. 1B.

At step S5040, user device 100 may determine whether the holding direction and the display direction of user device 100 are proper to the display aspect ratio and the display direction of the first display setting by comparing the determined holding direction and display direction of user device 100 with the display aspect ratio and the display direction of the first display setting.

When the holding direction and the display direction of user device 100 are proper to the display aspect ratio and the display direction of the first display setting (Yes-S5040), user device 100 may continually display the received video without converting the video at step S5100. In accordance with one embodiment, user device 100 may determine that the holding direction and the display direction of user device 100 are proper to the display aspect ratio and the display direction of the first display setting when the following conditions are met as shown in table 1.

TABLE 1

| First display setting of video | | Status of user device | | |
| --- | --- | --- | --- | --- |
| Display aspect ratio | Display direction | Holding direction | Display direction | Proper? |
| 16:9 | Landscape | Horizontal | Landscape | Yes |
| 16:9 | Portrait | Vertical | Portrait | No |
| 9:16 | Landscape | Horizontal | Landscape | No |
| 9:16 | Portrait | Vertical | Portrait | Yes |

However, the embodiments are not limited to Table. 1. For example, display aspect ratio and direction may be modified and changed in various conditions.

When they are not proper (No—S5040), user device 100 may initiate a conversion process and detect a target object at each image frame and trace the target object at each image frame at step S5050.

For example, user device 100 may receive a user input to indicate a face of a predetermined person in an image frame, detect the face as a target object, and trace the detected frame along image frames. However, the embodiments of the present disclosure are not limited thereto. For example, the target object may be assigned by the producer of the video content, and the video contents may include information on the target object. As another example, the target object may be automatically assigned according to information included in the video contents, for example, a size of an object, a position of an object in each image frame, so forth. Furthermore, user device 100 may detect multiple target objects and trace the detected multiple target objects along the image frames.

Upon the detection, user device 100 may extract coordinate information of the target object at each image frame store the extracted coordinate information in a predetermined memory. In addition, user device 100 may detect multiple objects including the target object and secondary objects which are closely related to the target object, extract coordinate information (e.g., center coordinate) of detected multiple objects, and store the extracted coordinate information and addition information on the image frame, such as the order number of image frame, the order number of each scene related to the image frame, so forth.

At step S5060, user device 100 may determine whether error occurs in detecting the target object while tracing the target object along the consecutive image frames and correct information on coordinate of the target object if error occurs and correct the error when the error occurs. In accordance with an embodiment, the target object detection error may be determined by comparing the center coordinate of the target object in a previous image frame and the center coordinate of the target object in a current image frame. For example, when the distance between two center coordinates is greater than a predetermined threshold, user device 100 may determine the error occurs in the current image frame and compensate the error. Such an error detection and compensation will be described in more detail with FIG. 6 later.

At step S5070, user device 100 may define a region of interest (ROI) based on at least one of the detected target objects and the corrected target object. In accordance with one embodiment, user device 100 may manually receive inputs from a user to define a size or a shape of the region of interest when user device 100 receives the user input to indicate the target object. Using such user inputs, user device 100 may define the ROI based on the detected target object.

At step S5080, user device 100 may define a crop region based on the defined ROI. In accordance with an embodiment, user device 100 may define a crop area based on coordinate information of a target object and a region of interest. Such an operation for defining the crop region based on the target object and the region of interest will be described in detail with reference to FIG. 9 later.

At step S5090, user device 100 may reschedule rendering according to a time of recovering errors in detecting the target objects. In accordance with one embodiment, user device 100 may i) skip rendering image frames or ii) adjust one of the FPS and the resolution for adjusting a rendering schedule according to the time of correcting the target object and the ROI in order to seamlessly and continuously display the video. Such an operation will be described in detail with reference to FIG. 7 and FIG. 8 later.

At step S5090, user device 100 may convert the first display setting to second display setting to display the crop region in full screen of display to provide optimal viewing experience. In accordance with one embodiment, user device 100 may convert the first display setting of i) 16:9 aspect ratio, ii) HD resolution, iii) landscape display direction to the second display setting of i) 9:16 aspect ratio, ii) SD resolution, and iii) portrait display direction.

At step S5110, user device 100 may display the video with the second display setting. In accordance with one embodiment, user device 100 may display the crop region with the second display setting of i) 9:16 aspect ratio, ii) SD resolution, and iii) portrait display direction as shown in FIG. 15D.

At step S5120, user device 100 may determine whether a display direction is changed because the holding direction is changed. When the display direction is changed (Yes—S5120), user device 100 may initiate the operation of converting a video again at step S5050.

When the display direction is not changed (No—S5120), user device 100 may determine whether the displaying the video reaches to the end at step S5130. When it is not the end (No—S5130), user device 100 may continually display the video at step S5110. When it is the end (Yes—S5130), user device 100 may terminate the displaying the video contents.

Figure 6:
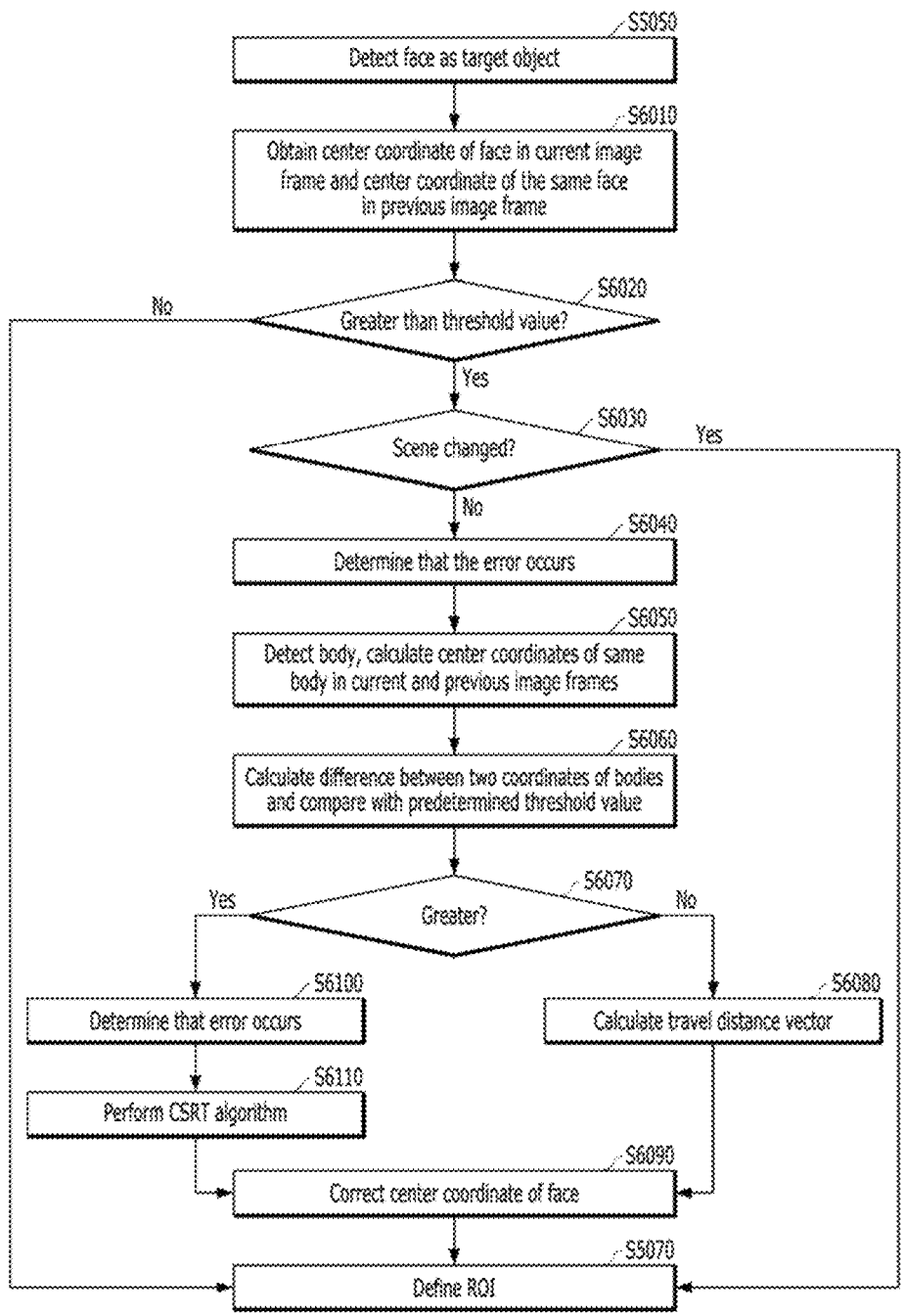
FIG. 6 is a flowchart showing a method of correcting errors in detecting a target object and defining a region of interest (ROI) in accordance with one embodiment

As described, user device 100 may correct errors in detecting a target object and defining a ROI at step S5060. Hereinafter, a method of correcting errors in detecting a target object and defining a region of interest (ROI) in accordance with another embodiment will be described with reference to FIG. 6. FIG. 6 is a flowchart showing a method of correcting errors in detecting a target object and defining a region of interest (ROI) in accordance with one embodiment Referring to FIG. 6, when a face is detected as a target object at step S5050, user device 100 may determine whether error occurs as follows. At step S6010, user device 100 may obtain a center coordinate of the face in a current image frame and a center coordinate of the same face in a previous image frame from memory 150. At step S6020, user device 100 may calculate a difference between two coordinates of the faces in the current image frame and the previous image frame and compare the difference with a predetermined threshold value. When the threshold is not greater than the difference (No-S6020), user device 100 may determine that error does not occur and define a ROI based on the detected face at step S5070.

When the threshold is greater than the difference (Yes—S6020), user device 100 may determine whether a scene is changed at the current image frame at step S6030. When the scene is changed (Yes—S6030), user device 100 may determine that error does not occur and define a ROI based on the detected face at step S5070.

When the scene is not changed (No—S6030), user device 100 may determine that the error occurs in detecting the target object at step S6040. At step S6050, user device 100 may detect a body closely related to the face as a secondary object, such as a body connected to the face, obtain a center coordinate of the detected body in the current image frame, and obtain the same of the previous image frame from memory 150. Such a body closely related to the face may be assigned or selected when the target object is selected by the user input or automatically assigned based on the relation with the target object.

At step S6060, user device 100 may calculate a difference between two center coordinates of the bodies in the current image frame and the previous image frame and compare the difference with the predetermined threshold value.

When the threshold is not greater than the difference (No—S6070), user device 100 may determine that error does not occur in detecting the body and calculate a travel distance vector between the bodies in the previous image frame and the current image frame at step S6080. At step S6090, user device 100 may correct the center coordinate of the face based on the calculated distance vector. For example, user device 100 may calculate the center coordinate of the face in the current image frame by adding the calculated travel distance vector to the center coordinate of the face in the previous image frame.

When the threshold is greater than the difference (Yes—S6070), user device 100 may determine whether error occurs in detecting the body too at step S6110. At step S6120, user device 100 may perform the CSRT operation. At step S6090, user device 100 may correct the center coordinate of the face based on the CSRT result.

At step S5070, user device 100 may define a region of interest (ROI) based on the corrected center coordinate of the face.

Figure 7:
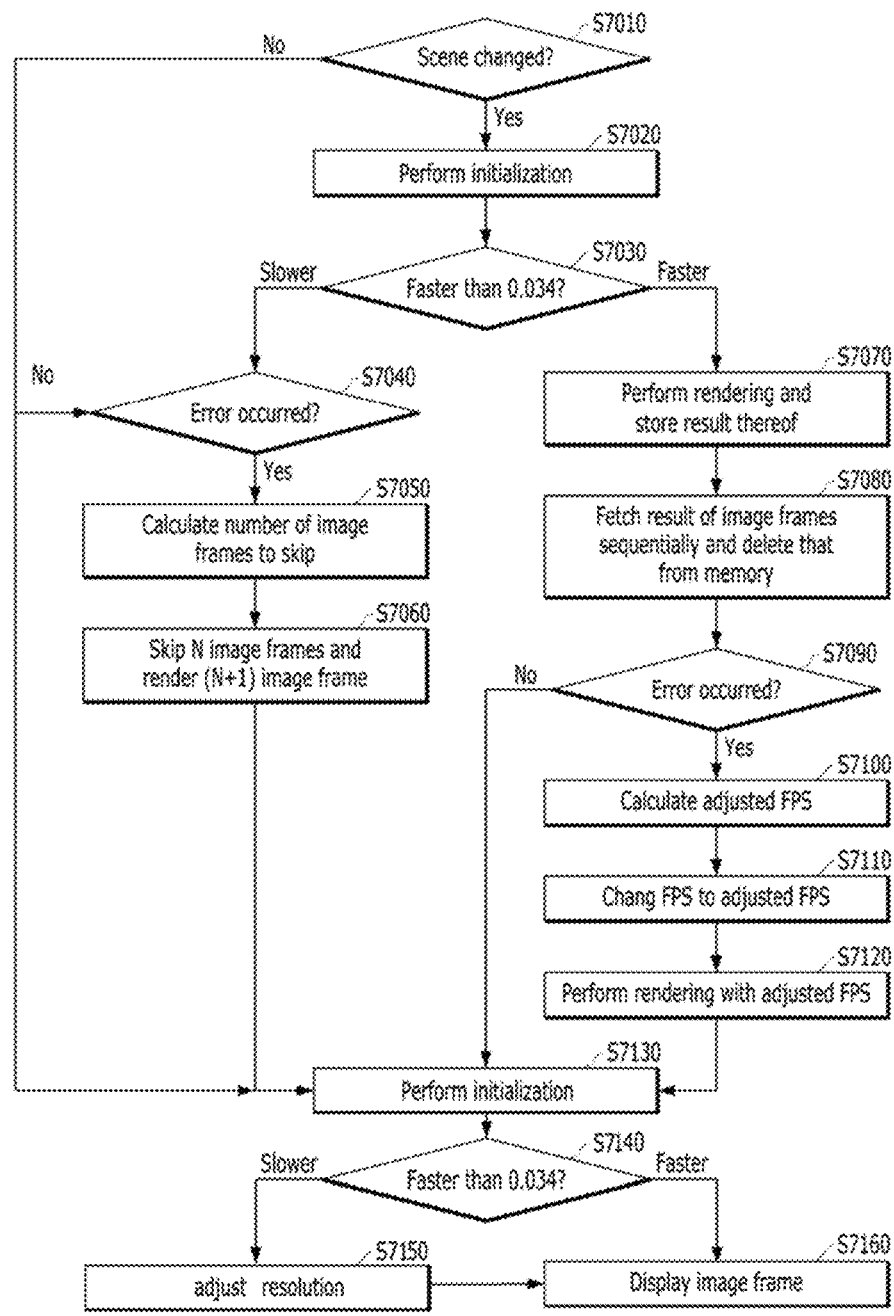
FIG. 7 is a flowchart showing a method of adjusting a render schedule in accordance with one embodiment.
Figure 8:
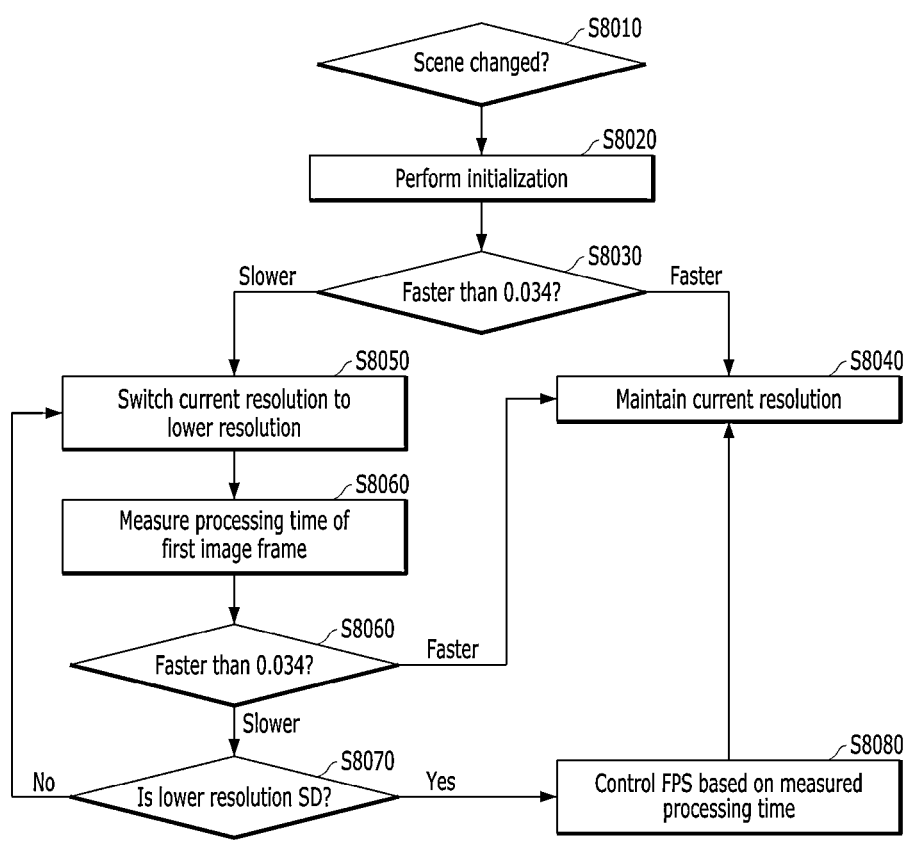
FIG. 8 is a flowchart showing a method of controlling a resolution to compensate delay caused by error in detecting target objects in accordance with one embodiment.

Hereinafter, an operation for adjusting a render schedule in accordance with one embodiment will be described in detail with reference to FIG. 7 and FIG. 8. FIG. 7 is a flowchart showing a method of adjusting a render schedule in accordance with one embodiment.

Referring to FIG. 7, user device 100 may determine whether a scene is changed or not when user device 100 starts processing each image frame at step S7010. When the scene is not changed (No—S7010), user device 100 may continuously render and display the image frame without adjusting a render schedule at step S7130.

When the scene is changed (Yes—S7010), user device 100 may perform an initialization process with the first image frame of each scene at step S7020. In accordance with one embodiment, user device 100 may measure i) a detection time for detecting target object (e.g., or multiple target objects and secondary objects) in the first image frame of each scene and ii) an image processing time of processing the first image frame of each scene. User device 100 may use the measured detection time and image processing time of the first image frame as a reference to compensate a time of correcting errors in detecting the target objects.

At step S7030, user device 100 may determine whether the measured processing time is slower or faster than 0.034 second (e.g., 43 ms). When the image processing time of the first image frame is slower than 34 ms (Slower—S7030), user device 100 may determine whether error occurs in a current image frame at step S7040.

When error does not occur (No—S7040), user device 100 may continuously render and display the image frame without adjusting FPS at step S7130. When error occurs (Yes—S7040), user device 100 may calculate the number of image frames to skip in order to compensate the delay caused by correcting the error in detecting the target object at step S7050. In particular, the number (NI) of image frames to skip may be calculated by the following Eq. 1 in accordance with one embodiment. In Eq. 1, "image processing time after error occurs" may include a time for correcting error after the error occurs.

$$Nf = \left[ \frac{\text{image processing time after error occurs}}{\text{image processing time before error occurs}} \right] - 1 \quad \text{Eq. 1}$$

At step S7060, user device 100 may skip the Nf image frames and start rendering at $(Nf+1)^{th}$ image frame. For example, when object detection error occurs at an $N^{th}$ frame (822), the rendering is carried out at the $(N+4)^{th}$ image frame because delay caused by correcting error at an image frame $(N+1)^{th}$ In this case, user device 100 may skip frames as long as the delay, without reprocessing the $(N+1)^{th}$ image frame again, then process the $(N+4)^{th}$ image frame. At step S7160, user device 100 may continuously render and display the image frame with the existing FPS from the $(Nf+1)^{th}$ image frame. In another embodiment, user device 100 may perform the initialization again at step S7130. If the processing time is slower than 0.034 second, user device 100 may adjust a resolution at step S7150 and then continuously render and display the image frame with the existing FPS from the $(Nf+1)^{th}$ image frame at step S7160. FIG. 14B shows skipping rendering of image frames in accordance with at least one embodiment. Referring to FIG. 14B, when error occurs in a N" image frame 822, user device 100 may calculate the number of image frames to skip as 4. In this case, user device 100 may skip rendering of a $(N+1)^{th}$ image frame to a $(N+4)^{th}$ image frame and restart rendering a $(N+5)^{th}$ image frame.

When the image processing time of the first image frame is faster than 34 ms (Slower—S7030), user device 100 may sequentially render consecutive image frames at user device 100's processing time cycle and store the result of rendering in memory 150 at step S7070, as shown as 832 in FIG. 14C. User device 100 may sequentially fetch the result of rendering from memory 150 and display the image frames before error occurs, and user device 100 may delete the fetched result from memory 150 as step S7080.

At step S7090, user device 100 may determine whether error occurs in a current image frame. When error does not occur (No—S7090), user device 100 may continuously render and display the image frame without adjusting FPS at step S7130.

When error occurs (Yes—S7090) as shown as 833 in FIG. 14C, user device 100 may adjust a frame rate (e.g., FPS) at step S7100. Such an operation for adjusting FPS will be described with reference to FIG. 14C. In accordance with one embodiment, when the image processing time of the first image frame is within or faster than about 34 ms, a rendering speed of user device 100 is faster than obtaining coordinate information of a target object (e.g., target objects). Accordingly, user device 100's rendering time is faster than FPS, and the user device 100 may obtain the coordinate information of the target object (e.g., rendering results) and store it in memory 150 (832) before object detection error (833) occurs as shown in FIG. 14C. After detecting the object detection error (833), the rendering and displaying are performed based on the coordinate information stored in memory 150. Further, user device 100 may adjust the frame rate (FPS) based on the number of stored coordinate information and the image processing time 830.

In accordance with one embodiment, user device 100 may calculate an adjusted FPS using the following Eq. 2.

$$\text{adjusted } FPS = \left\lceil \frac{\text{the number of resultances previously stored in the cash} + 30}{\text{image processing time after error} \times 30} \right\rceil \quad \text{Eq. 2}$$

*The maximum adjusted FPS is 30.

In Eq. 2, 30 is the maximum adjusted FPS. Since the resultants of 30 image frames are further generated after the object detection error occurs, 30 is added to the resultants previously stored in the cash. There is an assumption that the maximum number of image frames is 30. Further, 30 is multiplied to the image processing time after the object detection error because it is assumed that the maximum time of consecutive object detection errors is set to 30.

For example, it is assumed that i) a time of obtaining coordinate information of a target object at each frame is extended to 100 ms because of the object detection error, and that ii) there are 20 resultants of obtaining coordinate information of the target object, stored in cash. In this case, adjusting circuit 250 may adjust FPS to 13.34 frames/second based on (20+30)/(100 ms×30)=13.34 (frames). Accordingly, video is reproduced and displayed naturally although the detection error occurs in accordance with at least one embodiment.

At step S7110, user device 100 may change the existing FPS to the calculated adjusted FPS. User device 100 may render the image frames with the adjusted FPS at step S7120 and continuously display the video at step S7160. In another embodiment, user device 100 may perform the initialization again at step S7130. If the processing time is slower than 0.034 second, user device 100 may adjust a resolution at step S7150 and then continuously render and display the video at step S7160.

As described, a resolution may be also adjusted to compensate the delay caused by the error in detecting the target object in accordance with one embodiment. Hereinafter, such an operation will be described with reference to FIG. 8. FIG. 8 is a flowchart showing a method of controlling a resolution to compensate delay caused by error in detecting target objects in accordance with one embodiment. Referring to FIG. 8, user device 100 may determine whether a scene is changed at step S8010. When the scene is not changed (No—S8010), user device 100 may maintain a current resolution at step S8040.

When the scene is changed (Yes—S8010), user device 100 may measure a processing time of processing the first image frame of the current scene at step S8020. User device 100 may determine whether the processing time is faster than 0.034 second at step S8030. When the processing time is faster than 0.034 second (Faster—S8030), user device 100 may maintain the current resolution at step S8040.

When the processing time is slower than 0.034 second (Slower-S8030), user device 100 may switch the current resolution to a resolution lower than the current resolution at step S8050. After lowering, user device 100 may measure the processing time again at step S8060 and determine whether the processing time is faster than 0.034 second at step S8070. When the processing time is faster than 0.034 second (Faster—S8070), user device 100 may maintain the current resolution at step S8040.

When the processing time is slower than 0.034 second (Slower—S8070), user device 100 may determine whether the current resolution is SD at step S8080. If the current resolution is SD (Yes—S8080), user device 100 may initiate controlling FPS based on measured processing time at step S8090. If the current resolution is not SD (No—S8080), user device 100 may switch the current resolution to one step lower resolution again at step S8060.

FIG. 14D illustrates pseudo codes for adjusting a resolution in accordance with at least one embodiment. Referring to FIG. 14D, if an image processing time is greater than 0.034 seconds as shown 840, it is determined that the capability of user device 100 may be not proper enough to play video at a typical display speed.

In this case, user device 100 may reduce the resolution from FHD to HD as shown 841, or further reduce HD to SD as shown in 842. Then, user device 100 may measure a time of image processing again at the first image frame. If an image processing time is still greater than 0.034 seconds as shown in 844, user device 100 may adjust FPS based on the measured delay image.

Figure 9:
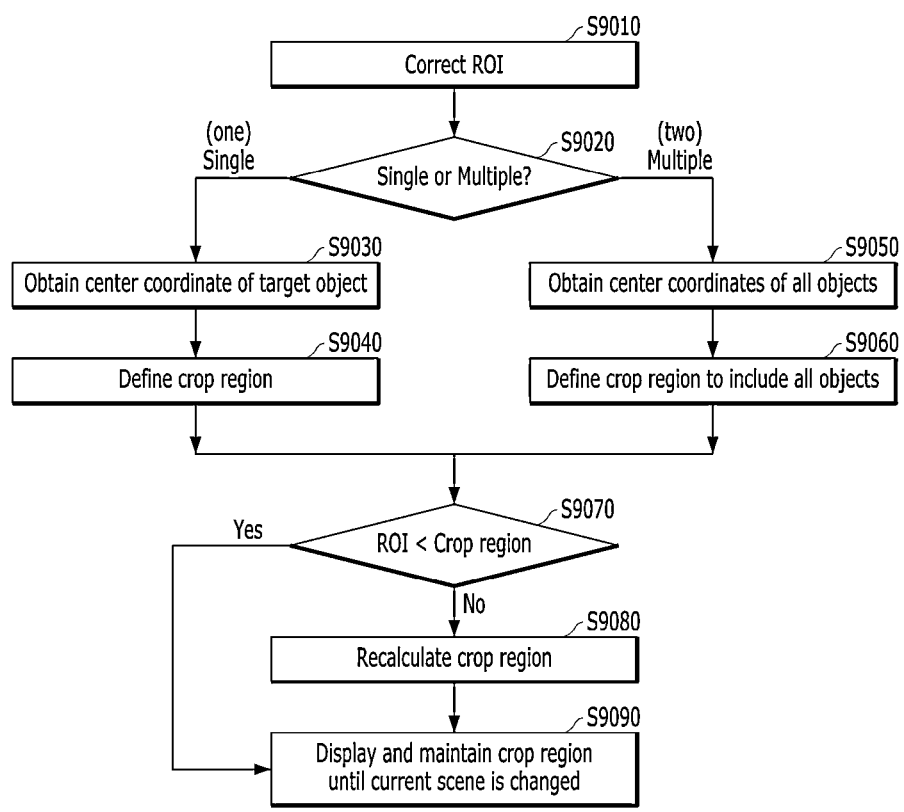
FIG. 9 is a flowchart showing a method for defining a crop region based on a ROI in accordance with one embodiment.

Hereinafter, an operation for defining a crop region based on a region of interest (ROI) in accordance with one embodiment will be described with reference to FIG. 9. FIG. 9 is a flowchart showing a method for defining a crop region based on a ROI in accordance with one embodiment. Referring to FIG. 9, user device 100 may correct a region of interest (ROI) based on one or more detected target objects at step S9010. At step 9020, user device 100 may determine whether single target object is detected or multiple target objects are detected.

When single target object is detected (Single—S9020), user device 100 may obtain a center coordinate of the target object at step S9030 and define a crop region 903 to include the detected target object using the following equation Eq. 3 at step S9040.

$$\text{start}(x,y) = ((\text{center\_}x - 303.75), 0)$$

$$\text{end}(x,y) = ((\text{center\_}x + 303.75), 1920) \quad \text{Eq. 3}$$

In Eq. 3, center_x denotes a center_x coordinate of a target object. Eq. 3 is provided under assumption that a first type video is produced and encoded to have a display aspect ratio of 16:9 and a resolution of 1920:1080. Accordingly, Eq.

3 may be modified according to the display aspect ratio and the resolution when the assumption of the display aspect ratio and the resolution is changed.

In accordance with another embodiment, the following equation Eq. 4 may be used to define a crop region 912 when the deep learning is used to set the ROI 911.

$$\text{start}(x,y)=((\text{center}\_x-\text{RoI}\_x/2-\text{margin}),0)$$

$$\text{end}(x,y)=((\text{center}\_x+3\text{RoI}\_x/2-\text{margin}),1920) \quad \text{Eq. 4}$$

In Eq. 4, RoI_x is a horizontal length of the region of interest (ROI).

When multiple target objects are detected (Multiple-S9020), user device 100 may obtain center coordinates of the multiple target objects at step S9050 and define a crop region to include all the target objects at step S9060. For example, user device 100 may use the following Eq. 5 for defining a crop region to include multiple target objects.

$$\text{start}(x,y)=((\text{center}\_x\_A-\text{RoI}\_x\_A/2-\text{margin}),0)$$

$$\text{end}(x,y)=((\text{center}\_x\_B+3\text{RoI}\_x\_B/2-\text{margin}),1920) \quad \text{Eq. 5}$$

In Eq. 5, center_x_A denotes a center x coordinate of the first object and RoI_x_A denotes a horizontal length of a ROI of the first object.

At step S9070, user device 100 may determine whether the defined crop region include the ROI. When the defined crop region includes the ROI (Yes—S9070), user device displays the crop region as the second video and matin the defined crop region unit a current scene is changed at step S0990. When the defined crop region does not include the ROI (No—S9070), user device 100 may redefine the crop region to have a bigger size in order to include all the detected objects at step S9080.

As described, user device 100 may convert a video being played according to changes in a holding direction and a display direction of user device, by a) detecting at least one target object in each image frame, b) tracing the detected target object along image frames of the video, c) detecting and compensating errors in detecting the target objects, d) defining a region of interest (ROI) in each image frame, e) defining a crop region to include the ROI, f) adjusting one of FPS and resolution according to the delay caused by compensating the error, e) converting the display setting of video to properly render and display the crop region with the adjusted FPS and resolution, and f) continuously and seamlessly rendering and displaying the video based on the crop region and the converted display setting.

In addition to the conversion operation, user device 100 may perform post processes, such as rearranging a subtitle on a crop region and displaying a surface view of a target object on video in accordance with one embodiment.

Figure 16A:
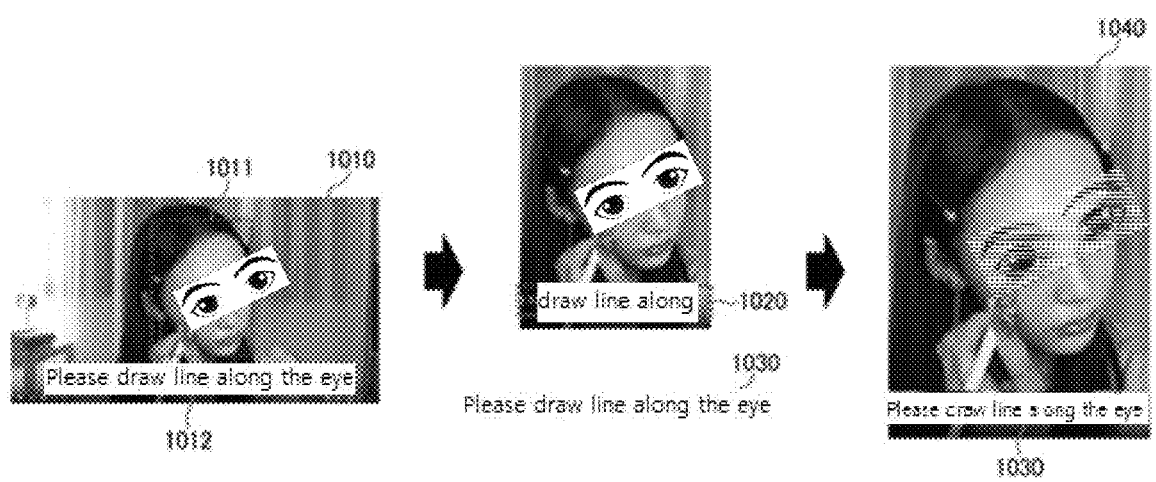
FIG. 16A and FIG. 16B are diagrams for describing a post process in accordance with at least one embodiment.
Figure 16B:
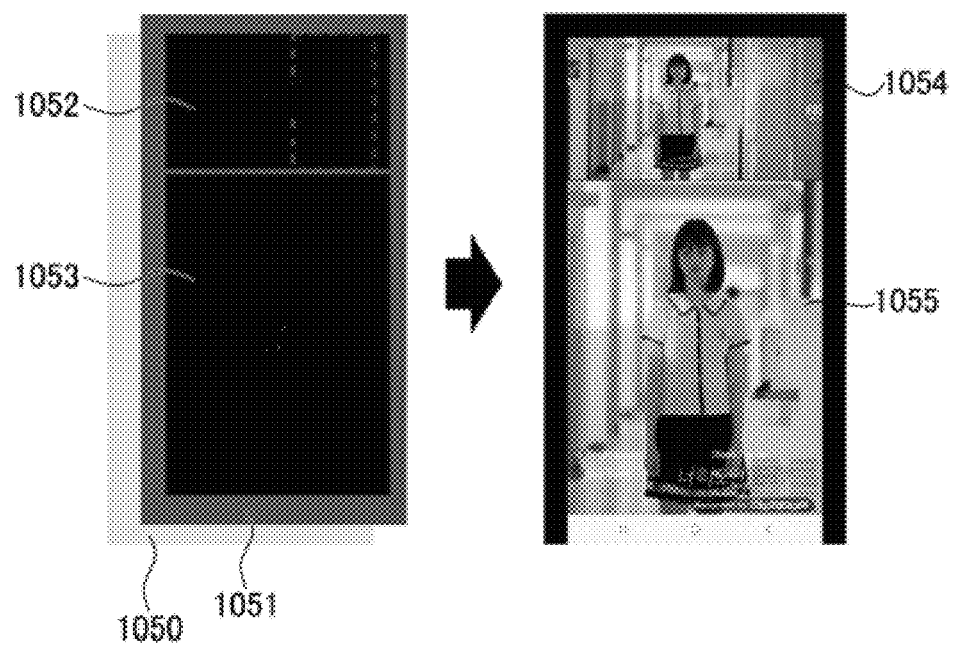

FIG. 16A and FIG. 16B are diagrams for describing a post process in accordance with at least one embodiment. FIG. 16A is a diagram showing rearranging a subtitle on a crop region as a post process in accordance with at least one embodiment. Referring to FIG. 16A, user device 100 may detect a target object from an image 1010, define a ROI 1011 for the detected target object, and detect a subtitle region 1012 from the image frame 1010.

User device 100 may define a location of the subtitle region in the crop region 1020 based on the ROI 1010. User device 100 may apply the detected subtitle region 1030 in the second video based on the crop region 1020 when the subtitle region 1030 is detected from the image. For example, user device 100 may map a starting position and an end position of the subtitle region to the crop region 1020.

As another example, user device 100 may receive subtitles from separate server 130 and apply the received subtitles on the second video by rearranging a position of the received subtitles on the cropped image.

FIG. 16B is a diagram showing a dual view mode as a post process in accordance with one embodiment. The dual view mode simultaneously displays a first video (e.g., received video) with a second video (e.g., a converted video) in accordance with at least one embodiment. Referring to FIG. 16B, user device 100 may display the second video (e.g., crop region) 055 simultaneously with the first video 1054, as supplemental image. In particular, after defining a crop region and generating a second display setting for the crop region, user device 100 may display the crop region as a surface view on the original video as shown in FIG. 16B. For example, user device 100 may define a vertical view region 1053 in a surface view 1051 to display the crop region as a second video 1055. Then, user device 100 may display the first video 1054 with the first display setting in a web view 1050 and display the surface view 1051 having the crop region 1055 as a second video on the web view 1050 simultaneously as shown in 16B.

Figure 17A:
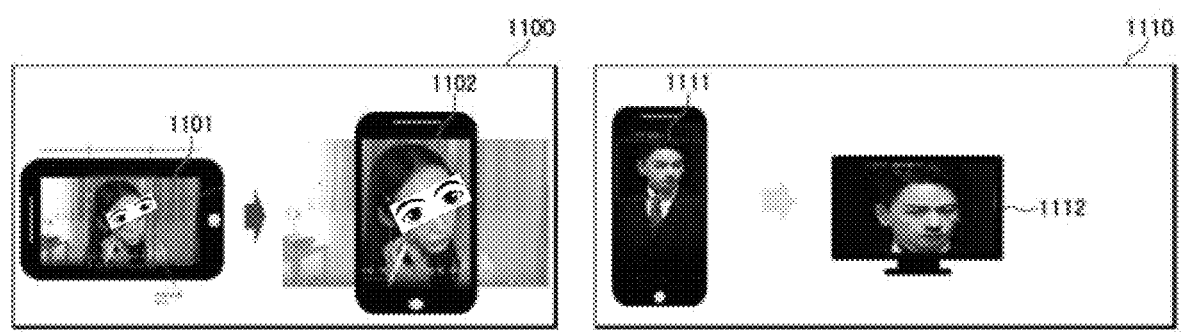
FIG. 17A to FIG. 17E show various exemplary implementations of the present disclosure.
Figure 17B:
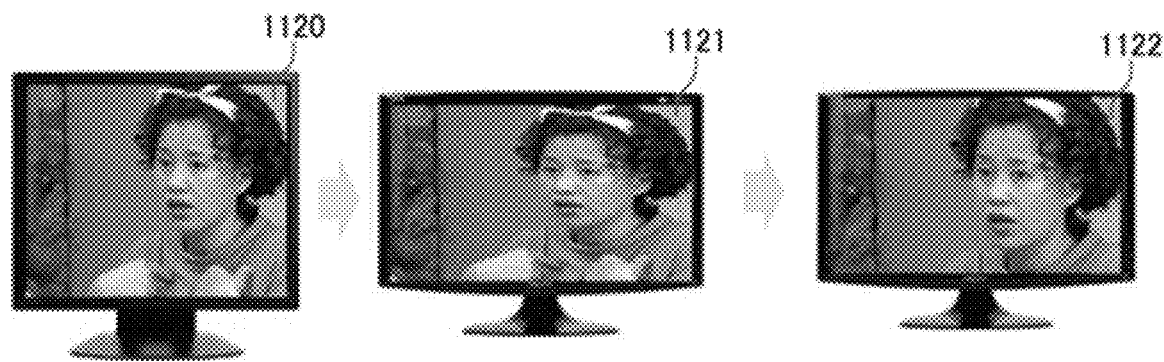

The embodiments of the present disclosure may be used to provide various services to users. FIG. 17A to FIG. 17E show various exemplary implementations of the present disclosure. For example, FIG. 17A is a diagram showing an exemplary implementation of the present disclosure. Referring to FIG. 17A, a first diagram 1100 shows that i) a first video 1101 is displayed at a 16:9 display aspect ratio and a landscape display direction, ii) the first video 1101 may be converted to a second video 1102 according to change in a holding direction of a smart phone, and iii) the second video 1102 is displayed at a 9:16 display aspect ratio and a portrait display direction. A second diagram 1110 shows an opposite implementation. For example, i) a first video is displayed on a smart phone according to a vertical holding direction of the smart phone (e.g., the first video is displayed at a 9:16 display aspect ratio and a portrait display direction, ii) a region of interest 1111 may be defined, iii) the region of interest 1111 is converted to a second video 1112 according to a display direction of a monitor, and iv) the second video 1112 is displayed at a 16:9 display aspect ratio and a landscape display direction.

FIG. 17 B is a diagram showing another exemplary implementation of the present disclosure. For example, a first video may be converted to a second video according to a display aspect ratio of a device that displays the second video. As shown in FIG. 17B, a crop region may be defined according to a region of interest in a first video, and the crop region may be differently converted to second videos according to display aspect ratios of monitors 1120, 1121, and 1122.

Figure 17C:
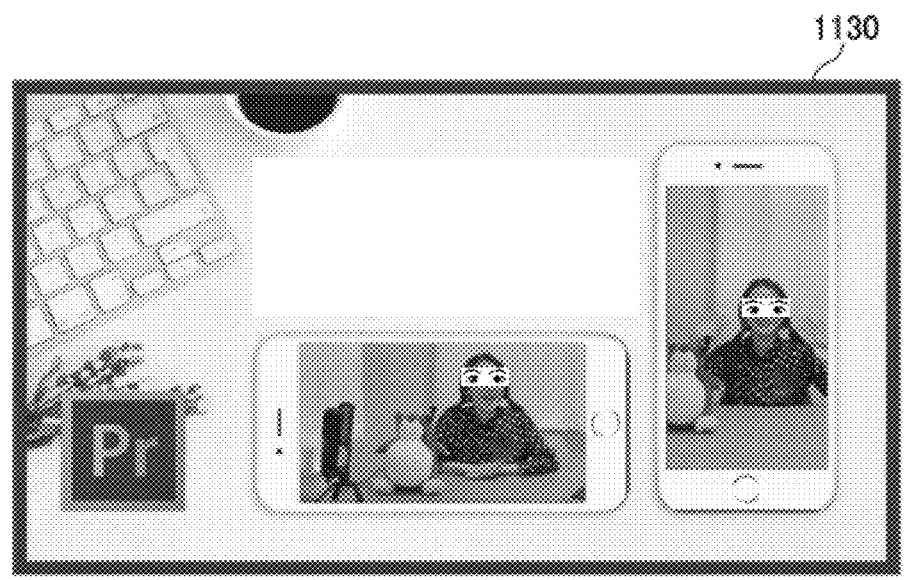

FIG. 17C is a diagram showing another exemplary implementation of the present disclosure. Referring to FIG. 17C, a method of dynamically converting a video according to changes in a display aspect ratio and a holding direction may be implemented as a video conversion and recording tool (e.g., app) for enabling a user to record (e.g. store) a region of interest in video according to a desired display aspect ratio.

Figure 17D:
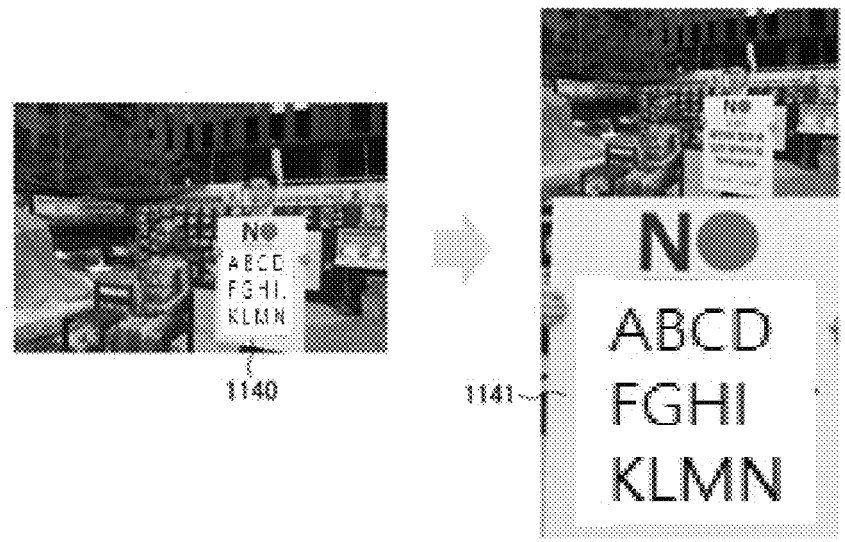

FIG. 17D is a diagram showing further another exemplary implementation of the present disclosure. As shown in FIG. 17D, the embodiments may be implemented as a senior service. For example, a region of small characters in a first video may be defined as a region of interest 1140 and a crop region 1140, the first video may be displayed on a web view, and the magnified crop region 1141 is simultaneously displayed on the first video as a surface view in accordance with one embodiment. In this case, a senior user may be very convenient to read information in such small characters.

Figure 17E:
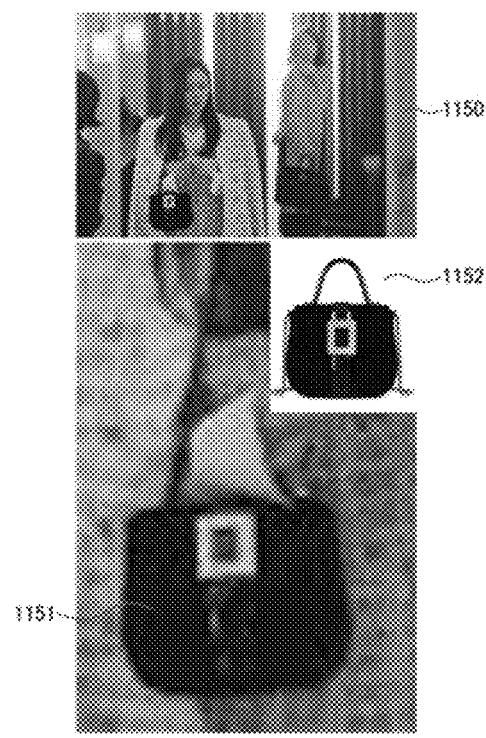

FIG. 17E is a diagram showing still another exemplary implementation of the present disclosure. As shown in FIG. 17E, the embodiments may be implemented as a service for promoting and advertising predetermined products or goods and providing supplementary information on the predetermined products or goods. The predetermined products or goods may be selected by a user through touching one of products displayed within an image frame for obtaining more information thereof. The predetermined products or goods may be also assigned by a producer for promoting and advertising the products when video contents are produced. In this case, the video contents include information on the product for promoting and advertising. For example, a first video 1150 may be displayed as a web view, a crop region 1151 in the first video 1150 may be defined based on the bag (e.g., target object) in the first video, the crop region 1151 is simultaneously displayed on the first video as a surface view, and product information 1152 may be also displayed with the crop region 1151 on the surface view.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A user device for dynamically converting a video according to status changes, the user device comprising:
   an input/output circuit configured to receive user inputs and output results of performing operations in response to the received user inputs;

a communication circuit configured to receive data from and transmit data to other entities connected through a communication network;

a display configured to output information and data produced as a result of performing operations;

a memory configured to store information and data, received from other entities through the communication circuit or generated as a result of performing operations;

a sensor configured to sense a holding direction of the user device; and a processor configured to:
generate a request message for requesting a predetermined video to a contents server and transmit the request message to the contents server through the communication circuit, receive the requested video from the contents server in response to the request message through the communication circuit, detect a target object from each image frame of the received video and define a region of interest based on the detected target object;

determine whether error occurs in detecting the target object at each image frame and correct the region of interest when error occurs;

defining a crop region based on the corrected region of interest; and converting the received video to a second video based on the crop region, and wherein the processor configured to:
trace the target object along consecutive image frames of the received video;

extract information on a coordinate of the traced target object from each image frame;

calculate a difference between the coordinate of the target object in a previous image frame and a current image frame; and determine that error occurs in detecting the target object in the current image frame when the difference is greater than a predetermined threshold value.

2. The user device of claim 1, wherein the processor is configured to:
trace a first element of the target object along consecutive image frames of the received video; and
extract information on a center coordinate of the first element from each image frame.

3. The user device of claim 2, wherein the processor is configured to:
determine whether a scene is changed between adjacent image frames where the first element is detected; and
when the scene is not changed, calculate a difference between the coordinate of the first element in a previous image frame and the same in a current image frame, determine whether the difference is greater than a predetermined threshold value, and determine that error occurs in detecting the first element in the current image frame when the difference is greater than the predetermined threshold value.

4. The user device of claim 3, wherein the processor is configured to:
correct the coordinate of the first element in the current image frame when error occurs in detecting the first element in the current image frame.

5. The user device of claim 3, wherein the processor is configured to:
detect a second element closely related to the first element from each image frame; and
extract a coordinate of the detected second element from each image frame; and
calculate a difference between the coordinate of the second element in a previous image frame and the same in a current image frame, compare the difference with a predetermined threshold value, and determine whether error occurs in detecting the body in the current image frame according to the comparison result.

6. The user device of claim 5, wherein the processor is configured to:
when error occurs in detecting the first element and when error does not occur in detecting the second element, calculate a travel path vector between the second element in a previous image and the same in a current image frame using the extracted coordinates of the second element, and correct the coordinate of the first element using the calculated travel path vector in the current image frame.

7. The user device of claim 2, wherein the processor is configured to:
correct the coordinate of the target object in the current image frame using a predetermined algorithm with at least one of color, hue, and edge of the target object.

8. The user device of claim 1, wherein the processor is configured to:
measure a processing time of processing a first image frame of each scene; and
adjusting at least one of a resolution and a frames per second (FPS) for a second video based on the measured processing time.

9. The user device of claim 8, wherein the processor is configured to:
when error occurs in detecting the target object and when the processing time is slower than a predetermined threshold time, adjust a rendering schedule by skipping rendering of a predetermined number of image frames.

10. The user device of claim 1, wherein the processor is configured to:
detect a subtitle region from each image frame;
convert the detected subtitle region based on the crop region; and
combine the converted subtitle region to the crop region.

11. A method for dynamically converting a video according to status changes, the method comprising:
generating a request message for requesting a predetermined video to a contents server and transmitting the request message to the contents server through the communication circuit;
receiving the requested video from the contents server in response to the request message through the communication circuit;
detecting a target object from each image frame of the received video and define a region of interest based on the detected target object;
determining whether error occurs in detecting the target object at each image frame and correct the region of interest when error occurs;
defining a crop region based on the corrected region of interest;
converting the received video to a second video based on the crop region,
wherein the determining whether error occurs comprises:
tracing the target object along consecutive image frames of the received video;
extracting information on a coordinate of the traced target object from each image frame;

calculating a difference between the coordinate of the target object in a previous image frame and a current image frame; and determining that error occurs in detecting the target object in the current image frame when the difference is greater than a predetermined threshold value.

12. The method of claim 11, wherein:

the tracing the target object comprises tracing a first element of the target object along consecutive image frames of the received video; and the extracting information comprises extracting information on a center coordinate of the first element from each image frame.

13. The method of claim 12, further comprising:

determining whether a scene is changed between adjacent image frames where the first element is detected;

when the scene is not changed, calculating a difference between the coordinate of the first element in a previous image frame and the same in a current image frame, determining whether the difference is greater than a predetermined threshold value, and determining that error occurs in detecting the first element in the current image frame when the difference is greater than the predetermined threshold value; and correcting the coordinate of the first element in the current image frame when error occurs in detecting the first element in the current image frame.

14. The method of claim 12, wherein the processor is configured to:

the tracing comprises detecting a second element closely related to the first element from each image frame; and the extracting comprises extracting a coordinate of the detected second element from each image frame.

15. The method of claim 14, further comprising:

calculating a difference between the coordinate of the second element in a previous image frame and the same in a current image frame, comparing the difference with a predetermined threshold value, and determining whether error occurs in detecting the second element in the current image frame according to the comparison result;

when error occurs in detecting the first element and when error does not occur in detecting the second element, calculating a travel path vector between the second element in a previous image and the same in a current image frame using the extracted coordinates of the body; and correcting the coordinate of the first element using the calculated travel path vector in the current image frame.

16. The method of claim 12, wherein the processor is configured to:

correcting the coordinate of the target object in the current image frame using a predetermined algorithm with at least one of color, hue, and edge of the target object.

17. A non-transitory computer-readable medium for storing computer-readable instructions such that, when executed, cause a process of a computer to perform a method for dynamically converting a video according to status changes, the method comprising:

generating a request message for requesting a predetermined video to a contents server and transmitting the request message to the contents server through the communication circuit;

receiving the requested video from the contents server in response to the request message through the communication circuit;

detecting a target object from each image frame of the received video and define a region of interest based on the detected target object;

determining whether error occurs in detecting the target object at each image frame and correct the region of interest when error occurs;

defining a crop region based on the corrected region of interest; and converting the received video to a second video based on the crop region, wherein the determining whether error occurs comprises:

tracing the target object along consecutive image frames of the received video;

extracting information on a coordinate of the traced target object from each image frame;

calculating a difference between the coordinate of the target object in a previous image frame and a current image frame; and determining that error occurs in detecting the target object in the current image frame when the difference is greater than a predetermined threshold value.

* * * * *